US008447093B2

(12) United States Patent
Nireki

(10) Patent No.: US 8,447,093 B2

(45) Date of Patent: May 21, 2013

(54) BANK NOTE PROCESSING DEVICE AND AUTHENTICATING METHOD

(75) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 383 days.

(21) Appl. No.: 12/865,534

(22) PCT Filed: Jan. 30, 2009

(86) PCT No.: PCT/JP2009/051598

§ 371 (c)(1), (2), (4) Date: Jul. 30, 2010

(87) PCT Pub. No.: WO2009/096534

PCT Pub. Date: Aug. 6, 2009

(65) Prior Publication Data

US 2011/0007960 A1 Jan. 13, 2011

(30) Foreign Application Priority Data

Jan. 30, 2008 (JP) ................................. 2008-018722

(51) Int. Cl.

*G06K 9/00* (2006.01)

*G06K 9/36* (2006.01)

(52) U.S. Cl.

USPC .......................................... 382/135; 382/286

(58) Field of Classification Search

None

See application file for complete search history.

(56) References Cited

U.S. PATENT DOCUMENTS 4,464,787 A * 8/1984 Fish et al. ..................... 382/135

6,354,507 B1 * 3/2002 Maeda et al. ................. 235/494

FOREIGN PATENT DOCUMENTS

| | | | |
|---|---|---|---|
| JP | 6 243234 | | 9/1994 |
| JP | 2001 236543 | | 8/2001 |
| JP | 2002 367001 | | 12/2002 |
| JP | 2006 293464 | | 10/2006 |
| JP | 2006293464 | * | 10/2006 |

* cited by examiner

*Primary Examiner* — Stephen R Koziol

*Assistant Examiner* — Timothy Choi

(74) *Attorney, Agent, or Firm* — Edwards Wildman Palmer LLP

(57) ABSTRACT

A bill processing apparatus capable of conducting accurately an authenticity judgment of a bill, which is caused to expand or contract, and an authenticity judgment process method employed therein. The bill processing apparatus includes a bill reader reading a bill, a reference data storage part storing an allowable range acceptable from a reference value as a standard length of a printed area on each surface thereof; and a comparison judgment part executing an authenticity judgment process by comparing the corrected data with an allowable ranged for the other surface stored in the storage part, the actual measurement data on the other surface being corrected based on a correction value calculated with respect to the actual measurement data for the one surface, when the actual measurement data of the length of the printed area of the one surface is out of the allowable range.

14 Claims, 16 Drawing Sheets

*Fig. 9*

Dictionary data

| No. | Length (pixel)(X) | Deviation (X-μ) | Squared deviation $(X-\mu)^2$ | No. | Length (pixel)(X) | Deviation (X-μ) | Squared deviation $(X-\mu)^2$ |
|---|---|---|---|---|---|---|---|
| 1 | 270.00 | 5.64 | 31.81 | 26 | 269.00 | 4.64 | 21.63 |
| 2 | 262.00 | -2.36 | 5.57 | 27 | 265.00 | 0.64 | 0.41 |
| 3 | 266.00 | 1.64 | 2.69 | 28 | 265.00 | 0.64 | 0.41 |
| 4 | 269.00 | 4.64 | 21.53 | 29 | 263.00 | -1.36 | 1.85 |
| 5 | 262.00 | -2.36 | 5.57 | 30 | 270.00 | 5.64 | 31.81 |
| 6 | 260.00 | -4.36 | 19.01 | 31 | 261.00 | -3.36 | 11.29 |
| 7 | 262.00 | -2.36 | 5.57 | 32 | 264.00 | -0.36 | 0.13 |
| 8 | 263.00 | -1.36 | 1.85 | 33 | 262.00 | -2.36 | 5.57 |
| 9 | 269.00 | 4.64 | 21.53 | 34 | 264.00 | -0.36 | 0.13 |
| 10 | 262.00 | -2.36 | 5.57 | 35 | 269.00 | 4.64 | 21.53 |
| 11 | 261.00 | -3.36 | 11.29 | 36 | 264.00 | -0.36 | 0.13 |
| 12 | 262.00 | -2.36 | 5.57 | 37 | 265.00 | 0.64 | 0.41 |
| 13 | 270.00 | 5.64 | 31.81 | 38 | 266.00 | 1.64 | 2.69 |
| 14 | 265.00 | 0.64 | 0.41 | 39 | 264.00 | -0.36 | 0.13 |
| 15 | 268.00 | 3.64 | 13.25 | 40 | 265.00 | 0.64 | 0.41 |
| 16 | 266.00 | 1.64 | 2.69 | 41 | 260.00 | -4.36 | 19.01 |
| 17 | 262.00 | -2.36 | 5.57 | 42 | 260.00 | -4.36 | 19.01 |
| 18 | 267.00 | 2.64 | 6.97 | 43 | 260.00 | -4.36 | 19.01 |
| 19 | 265.00 | 0.64 | 0.41 | 44 | 261.00 | -3.36 | 11.29 |
| 20 | 266.00 | 1.64 | 2.69 | 45 | 264.00 | -0.36 | 0.13 |
| 21 | 268.00 | 3.64 | 13.25 | 46 | 263.00 | -1.36 | 1.85 |
| 22 | 270.00 | 5.64 | 31.81 | 47 | 260.00 | -4.36 | 19.01 |
| 23 | 261.00 | -3.86 | 11.29 | 48 | 262.00 | -2.36 | 5.57 |
| 24 | 270.00 | 5.64 | 31.81 | 49 | 261.00 | -3.36 | 11.29 |
| 25 | 265.00 | 0.64 | 0.41 | 50 | 260.00 | -4.36 | 19.01 |
| | | | | | Average (μ) 264.36 | | |

| Variance ($\sigma^2$) (average of deviation's square) | Standard deviation (σ) |
|---|---|
| 10.27 | 3.20 |

BANK NOTE PROCESSING DEVICE AND AUTHENTICATING METHOD

FIELD OF THE INVENTION

The present invention relates to a bill processing apparatus (or banknote processing device) which is capable of carrying out an authenticity judgment of a bill and an authenticity judgment method (or authenticating method) employed in such bill processing apparatus.

BACKGROUND ART

In general, a bill processing apparatus is incorporated into a service providing device, such as a game medium rental machine installed in a game hall, a vending machine or a ticket-vending machine installed in a public space, or the like, which identifies the validity of a bill inserted from a bill insertion slot by a user, and provides various types of products and services in accordance with a value of the bill having been judged as valid.

The above-mentioned bill processing apparatus is, as disclosed in Patent Document 1, for example, configured to determine what kind of bill the inserted one is (authenticity judgment). The bill processing apparatus disclosed in Patent Document 1 performs a bill authenticity judgment by utilizing length data, and a light emitting element and a light receiving element are installed in a traveling route through which the bill is carried, to detect a length of the inserted bill. In particular, pattern comparison means for comparing pattern data of the bill based on time-series output from the light receiving element with the reference pattern data corresponding to the kind of the bill is provided such that the authenticity of the bill is judged based on the detected length data and a comparison result by the pattern comparison means.

[Patent Reference 1] Japanese unexamined patent application publication No. H6-243234

DISCLOSURE OF THE INVENTION

Problem to be Solved by the Invention

In a bill processing apparatus performing an authenticity judgment process by utilizing length data of a bill as described above, even an authentic bill may be judged as counterfeit since a bill expands or contracts. That is, usually, a bill is formed from a fibrous material, and therefore, the bill may contract as it dehydrates, for example, after containing moisture.

In consideration of the above, a bill processing apparatus which is capable of carrying out an authenticity judgment of a bill more accurately, and an authenticity judgment processing method employed in such bill processing apparatus.

Means to Solve the Problem

In the present invention, a bill processing apparatus comprises: bill reading means for reading a bill, an allowable range storage part which stores an allowable range acceptable from a reference value serving as a standard of length of a printed area for each of the respective surfaces of the bill, and a comparison judgment part which executes an authenticity judgment process such that, when actual measurement data of length about a printed area on one surface of the bill read by the bill reading means is out of the allowable range for the surface, a correction value for the actual measurement data is calculated, actual measurement data on the other surface is corrected based on the calculated correction value, and the corrected actual measurement data is compared with an allowable range for the other surface stored in the allowable range storage part. Further features of the present invention, its nature, and various advantages will be more apparent from the accompanying drawings and the following description of the preferred embodiment.

BRIEF DESCRIPTION OF THE DRAWINGS

FIG. 7 is a block diagram showing a configuration of control means for controlling driving of a bill conveyance mechanism, bill reading means, and so on.

FIG. 9 is a diagram illustrating a method of deriving an allowable ranged from actual measurement data of the printed area of the bill to be sampled.

DESCRIPTION OF NOTATIONS

Figure 1:
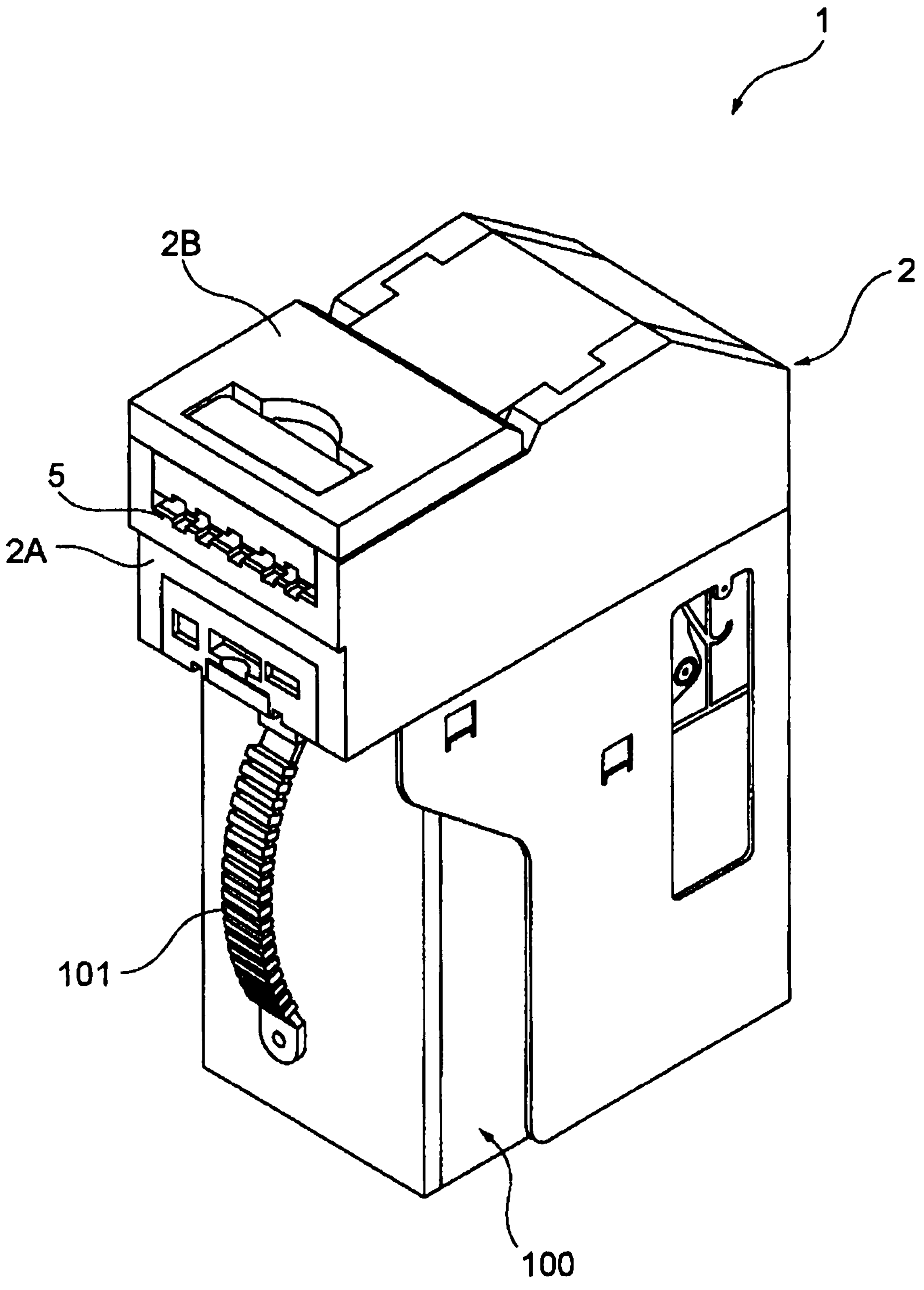
FIG. 1 is a perspective view showing an entire structure to illustrate a configuration of a bill processing apparatus of this embodiment.

1 bill processing apparatus
2 apparatus main body
3 bill traveling route
5 bill insertion slot
6 bill conveyance mechanism
8 bill reading means
10 skew correction mechanism
80 light emitting unit
80*a* first light emitting part

81 light receiving/emitting unit 81
81*a* light receiving part
81*b* second light emitting part
200 control means

BEST MODE FOR CARRYING OUT THE INVENTION

Hereinafter, an embodiment of the present invention will be described with reference to the drawings.

Figure 2:
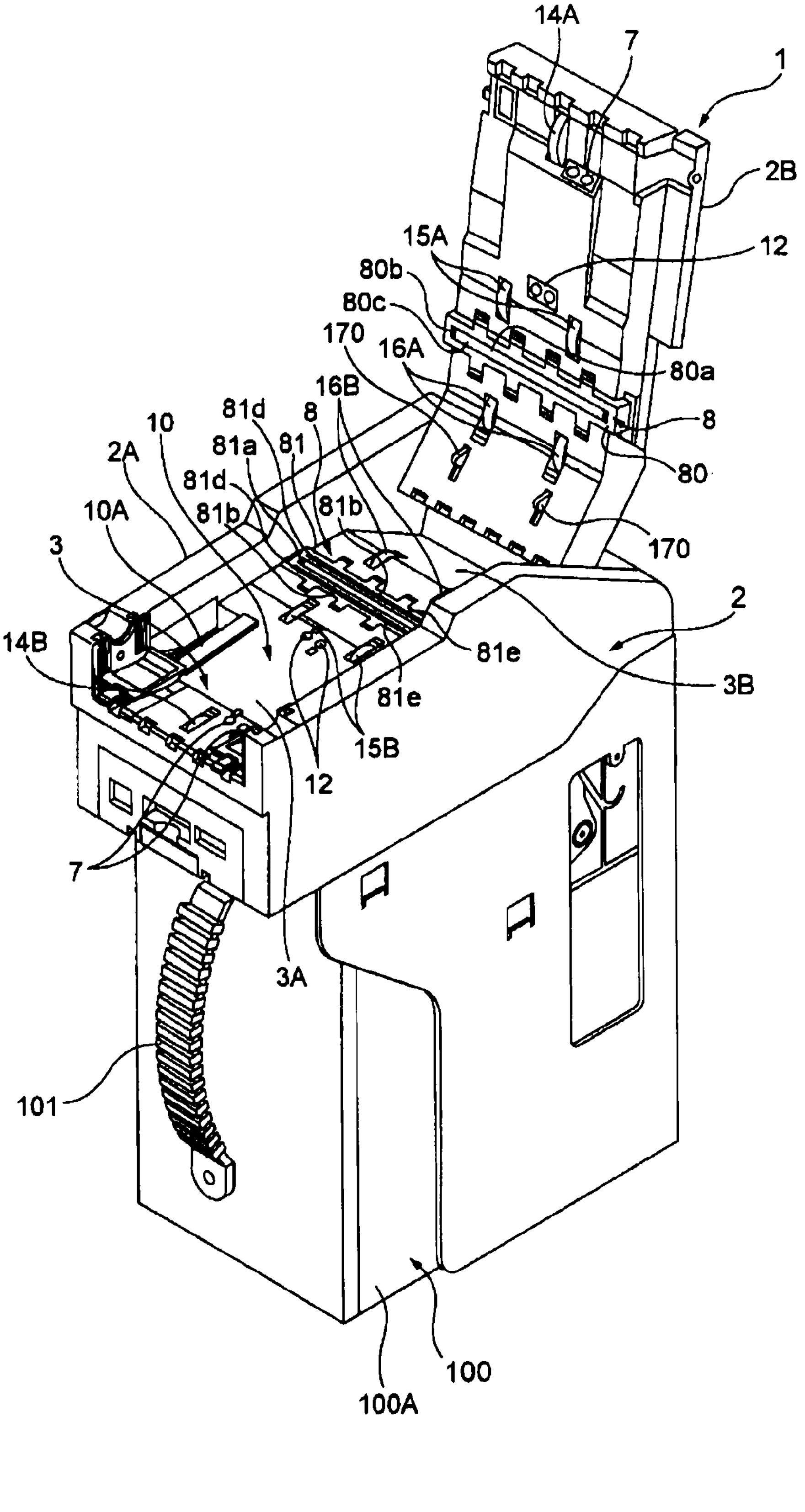
FIG. 2 is a perspective view showing the bill processing apparatus in a state that an open/close member is opened for a main body frame of an apparatus main body.
Figure 3:
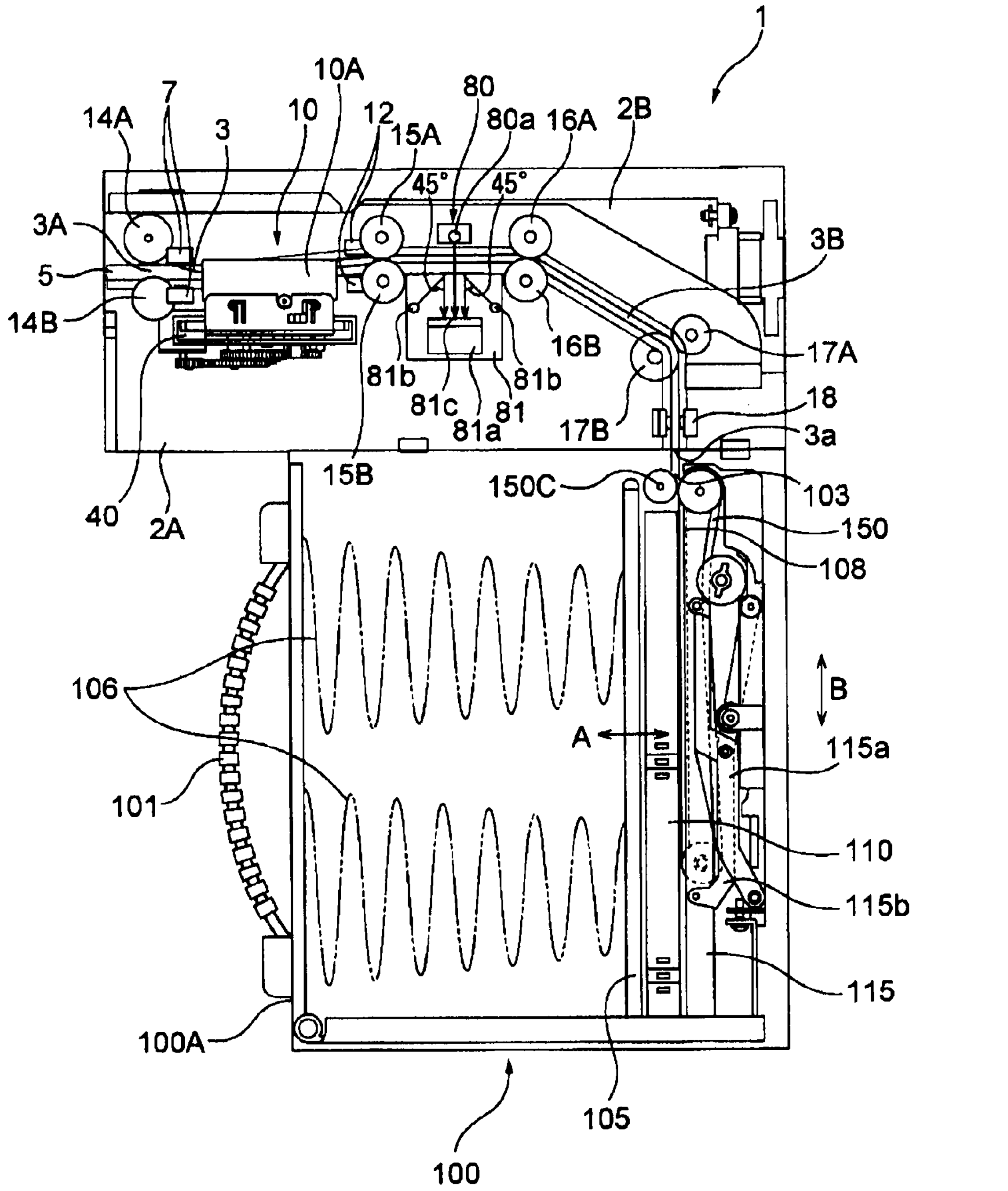
FIG. 3 is a right side view schematically showing a traveling route of a bill to be inserted from an insertion slot.
Figure 4:
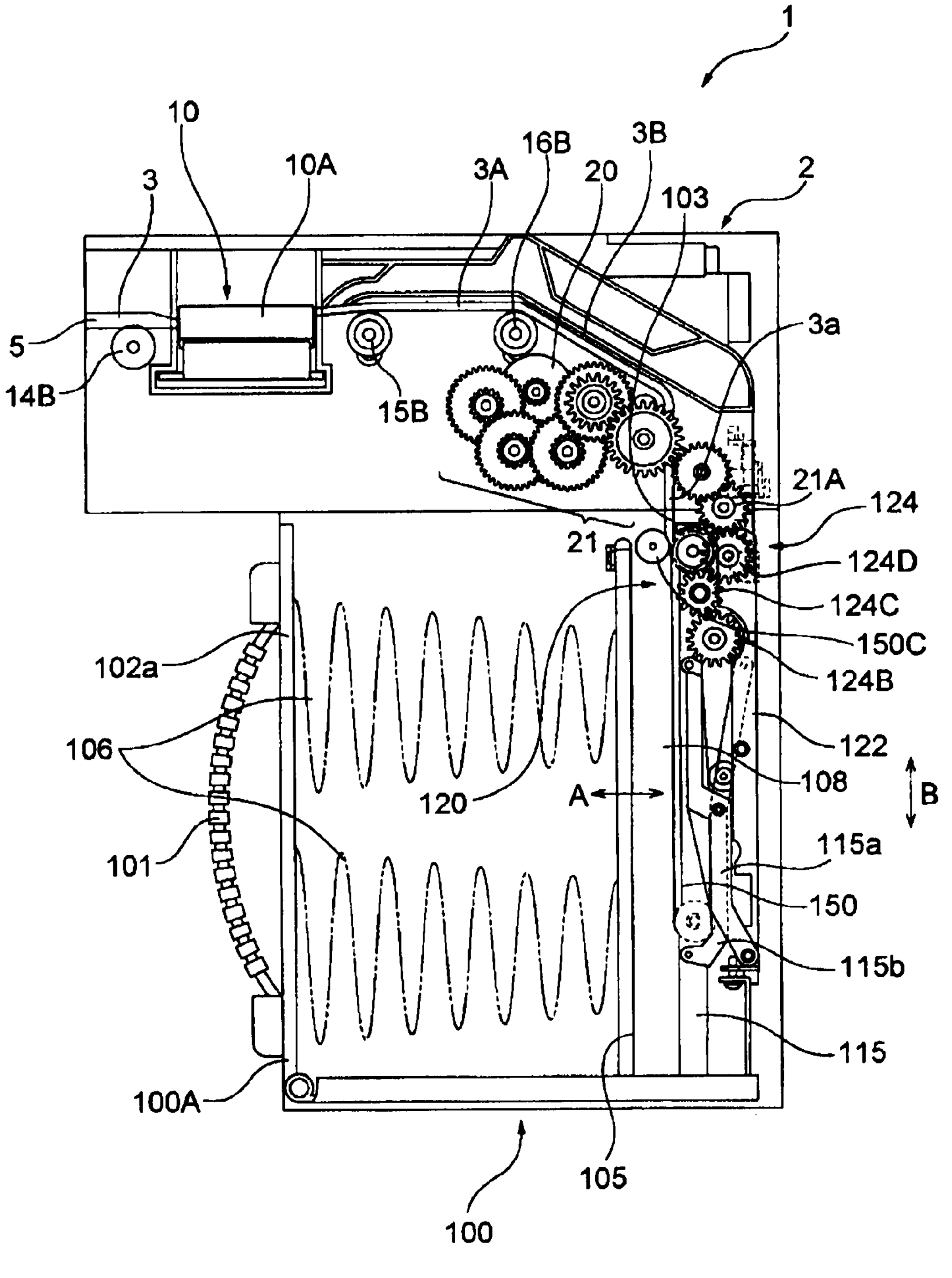
FIG. 4 is a right side view showing a schematic configuration of a driving force transmission for driving the presser plate arranged in a bill housing part.
Figure 5:
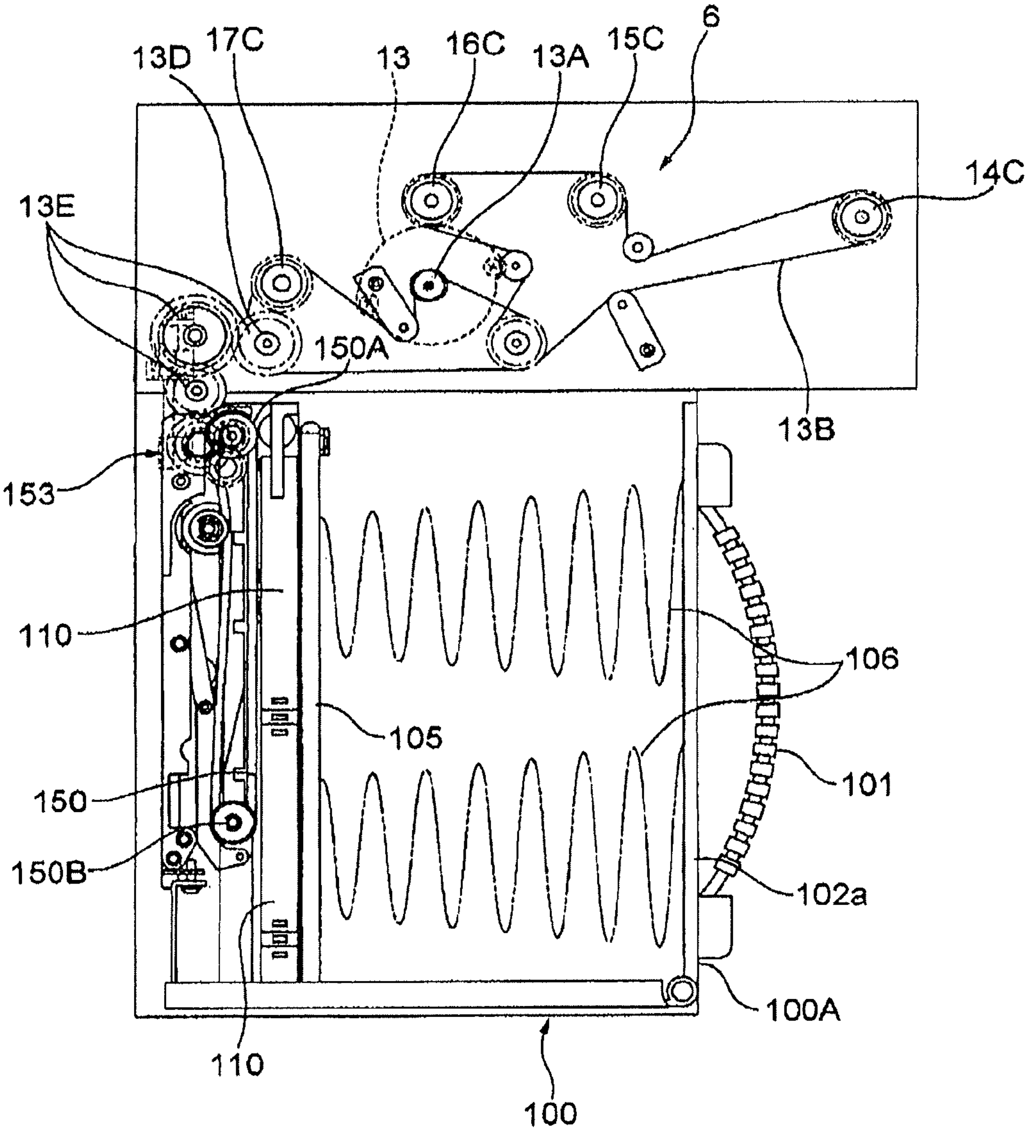
FIG. 5 is a left side view showing a schematic configuration of a driving source and a driving force transmission mechanism to drive a bill conveyance mechanism.

FIGS. 1 to 5 are diagrams showing a configuration of a bill processing apparatus according to this embodiment. FIG. 1 is a perspective view showing a general configuration thereof; FIG. 2 is a perspective view showing a state that an open/close member is opened for a main body frame of an apparatus main body; FIG. 3 is a right side view showing schematically a traveling route for a bill inserted from an insertion slot; FIG. 4 is a right side view showing schematically a driving force transmission mechanism for driving a presser plate installed in a bill housing part; and FIG. 5 is a left side view showing a schematic configuration of a driving source and a driving force transmission mechanism to drive a bill conveyance mechanism.

A bill processing apparatus 1 of this embodiment is so configured that it can be incorporated into, for example, various types of gaming machines such as a slot machine and the like, and the bill processing apparatus 1 includes an apparatus main body 2 and a housing part (e.g., stacker or cashbox) 100 which is provided to the apparatus main body 2 and is capable of stacking and housing a great number of bills. Here, the housing part 100 may be mountable to and demountable from the apparatus main body 2, and it is possible, for example, to remove from the apparatus main body 2 by pulling a handle 101 provided on the front face thereof in a state that a lock mechanism (not shown) is unlocked.

As shown in FIG. 2, the apparatus main body 2 has a main frame body 2A and an open/close member 2B being configured to be opened and closed for the main body frame 2A by rotating around an axis positioned at one end thereof as a rotating center. Then, as shown in FIG. 3, the frame 2A and the open/close member 2B are configured to form a space (bill traveling route 3) through which a bill is conveyed such that both face each other across the space when the open/close member 2B is closed for the main body frame 2A, and to form a bill insertion slot 5 such that front exposed faces of both are aligned and that the bill traveling route 3 exits at the bill insertion slot 5. In addition, the bill insertion slot 5 is a slit-like opening from which a short side of a bill can be inserted into the inside of the apparatus main body 2.

Also, in the apparatus main body 2, a bill conveyance mechanism 6 that conveys a bill along a bill traveling route 3; an insertion detecting sensor 7 that detects the bill inserted into the bill insertion slot 5; bill reading means 8 that is installed on a downstream side of the insertion detecting sensor 7 and reads out information on the bill in a traveling state; a skew correction mechanism 10 that accurately positions and conveys the bill with respect to the bill reading means 8; a movable piece passage detecting sensor 12 that detects that the bill passes through a pair of movable pieces constituting the skew correction mechanism; and a discharge detecting sensor 18 that detects that the bill is discharged into a bill housing part 100 are provided.

Hereafter, the respective components described above will be described in detail. The bill traveling route 3 extends from the bill insertion slot 5 toward the inside, and comprises a first traveling route 3A and a second traveling route 3B extending from the first traveling route 3A toward the downstream side and being inclined downwardly at a predetermined angle to the first traveling route 3A. The second traveling route 3B is bent in a vertical direction on the downstream side and a discharge slot 3*a* from which the bill is discharged into the bill housing part 100 is formed at an end portion on the downstream side such that the bill discharged from the discharge slot 3*a* is fed into a feed port (receiving port) 103 of the bill housing part 100 in the vertical direction.

The bill conveyance mechanism 6 is a mechanism capable of conveying the bill inserted from the bill insertion slot 5 along the insertion direction, and of conveying back the bill in an insertion state toward the bill insertion slot 5. The bill conveyance mechanism 6 comprises a motor 13 (refer to FIG. 5) serving as a driving source installed in the apparatus main body 2; and conveyor roller pairs (14A and 14B), (15A and 15B), (16A and 16B), and (17A and 17B) which are installed at predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 16B, and 17B installed on the underside of the bill traveling route 3 driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to convey the bill toward the back side, as shown in FIG. 2, is installed in one portion of the center position of the bill traveling route 3, and a couple of the conveyor roller pairs (15A and 15B), (16A and 16B), or (17A and 17B) being disposed in this order on the downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is sensed by the insertion detecting sensor 7.

Thus, the upper conveyor roller 14A is controllably driven to be pressed against or spaced from the lower conveyor roller 14B by a motor 70 (refer to FIG. 7) for an up-and-down movement of the roller as a driving source. In this case, when a process (skew correction process) for positioning the bill with respect to the bill reading means 8 by eliminating inclination of the inserted bill is executed by the skew correction mechanism 10, the upper conveyor roller 14A is spaced from the lower conveyor roller 14B so as to release the load on the bill, and when the skew correction process is completed, the upper conveyor roller 14A is driven to move toward the lower conveyor roller 14B again to hold (or nip) the bill therebetween. Here, the driving source may be constituted of a solenoid or the like instead of a motor.

Further, the skew correction mechanism 10 comprises a pair of right and left movable pieces 10A (only one side is shown) such that the pair of right and left movable pieces 10A are moved to get closer with each other by driving a motor 40 for a skew driving mechanism, whereby the skew correction process is performed for the bill.

The conveyor rollers 14B, 15B, 16B and 17B installed on the underside of the bill traveling route 3 are, as shown in FIG. 5, driven to rotate via the motor 13 and pulleys 14C, 15C, 16C, and 17C installed at the ends of the driving shafts of the respective conveyor rollers. That is, a driving pulley 13A is installed on the output shaft of the motor 13, and a driving belt 13B is wrapped around between the pulleys 14C, 15C, 16C, and 17C installed at the ends of the driving shafts of the respective conveyor rollers and the driving pulley 13A. In addition, tension pulleys are engaged in places with the driving belt 13B, which prevents the driving belt 13B from loosening.

In accordance with the configuration described above, when the motor 13 is driven to normally rotate, the conveyor rollers 14B, 15B, 16B, and 17B are driven to normally rotate in synchronization therewith to convey the bill toward the insertion direction. When the motor 13 is driven to reversely rotate, the conveyor rollers 14B, 15B, 16B, and 17B are driven to reversely rotate in synchronization therewith to convey back the bill toward the bill insertion slot 5 side.

The insertion detecting sensor 7 is to generate a detection signal when a bill inserted into the bill insertion slot 5 is detected. And when the detection signal is generated, the motor 13 is driven in a normal direction and the bill is conveyed in the insertion direction. The insertion detecting sensor 7 of this embodiment is installed between the pair of conveyor rollers (14A and 14B) and the skew correction mechanism 10 and comprises, for example, an optical sensor such as a regressive reflection type photo sensor. However, the insertion detecting sensor 7 may comprise a mechanical sensor other than the optical sensor.

Further, the movable piece passage detecting sensor 12 is to generate a sensed signal when it is sensed that a front end of the bill passes through a pair of right and left movable pieces 10A constituting the skew correction mechanism 10, and when the detection signal is generated, the driving by the motor 13 is stopped such that the skew correction is made. The movable piece passage detecting sensor 12 of this embodiment is disposed on the upstream side from the bill reading means 8 and also comprises an optical sensor or a mechanical sensor in the same way as mentioned before with respect to the insertion detecting sensor.

Further, the discharge detecting sensor 18 is to detect a back end of the bill passing through such that it is detected that the bill is discharged into the bill housing part 100. The discharge detecting sensor 18 is disposed just in front of the receiving port 103 of the bill housing part 100 on the downstream side of the second traveling route 3B. When the detection signal is transmitted from the discharge detecting sensor 18, the driving by the motor 13 is stopped and the conveyance processing of the bill is terminated. The discharge detecting sensor 18 also comprises an optical sensor or a mechanical sensor in the same way as the aforementioned insertion detecting sensor.

The bill reading means 8 reads bill information on the bill conveyed in a state that the skew is eliminated by the skew correction mechanism 10, and determines the validity (authenticity). In this embodiment, the bill reading means 8, which is installed in the above-mentioned first traveling route 3A, comprises a line sensor which irradiates the bill being conveyed from top and bottom sides thereof with light such that transmitted light and reflected light thereof are detected by a light receiving element so as to perform reading.

In this embodiment, in order to improve the identification accuracy of the authenticity, by utilizing the above-mentioned bill reading means 8, a first authenticity judgment process in which light is irradiated to a printed portion of (a bill to be conveyed, a transmitted light and a reflected light of the irradiated light are received, and it is determined whether or not a feature point in the printed portion (an area of the feature point and a way of extracting the area are arbitrary) matches that of an authentic one; and a second authenticity judgment process in which printing lengths on the both sides of the bill (which may be printing lengths of the entire printed areas or printing lengths between feature points after extracting the feature points) are actually measured by utilizing one or both of the transmitted light and the reflected light, and it is determined whether or not the bill is an authentic one on the basis of the printing lengths on the both surfaces, are performed.

In this case, the present invention has a feature in the above-mentioned second authenticity judgment process, and the second authenticity judgment process may be performed after executing the first authenticity judgment process, or may be executed before the first authenticity judgment process. In this embodiment, as will be described later, the apparatus is configured such that the second authenticity judgment process is performed after executing the first authenticity judgment process.

The above-mentioned first and second authenticity judgment processes are performed by irradiating the light having the predetermined wavelength from the light emitting means to the printed area on the surface of the bill being conveyed, acquiring transmitted-light data of the light transmitted through the bill and reflected-light data of the light reflected by the bill, and comparing such data with the reference data of the legitimate bill having stored in advance.

In this case, since the legitimate bill has some area from which different image data are acquired depending on the wavelengths of the lights (for example, visible light or infrared light) irradiated to the area, in the first authenticity judgment process, a plurality of light sources, in consideration of this view point, irradiate different lights of different wavelengths (in this embodiment, a red light and an infrared light are irradiated) to the bill and a transmitted light therethrough and a reflected light thereon are detected such that the authenticity identification accuracy may be improved. That is, since the red light and the infrared light have different wavelengths, transmitted-light data and reflected-light data from a plurality of lights of different wavelengths may be utilized for the bill authenticity judgment whereby the judgment may use the nature that the transmittance of the transmitted light transmitted through the specific area and the reflectance of the reflected light reflected on the specific area in the legitimate bill are different from those of the counterfeit bill. Therefore, an attempt is made to further improve the bill authenticity identification accuracy by employing light sources where a plurality of wavelengths are available.

Here, a concrete bill authenticity identification method will not be written in detail since it is possible to acquire various kinds of received-light data (transmitted-light data and reflected-light data) depending on the wavelengths of the irradiated lights to the bill and the irradiated areas of the bill. However, for example, in a watermarked area of the bill, if an image on the area is viewed with lights of different wavelengths, the image appears greatly different depending on the lights. Therefore, it can be considered that the bill to become an identification object is identified as the legitimate bill or the counterfeit bill by setting this portion as the specified area, acquiring transmitted-light data and reflected-light data from the specified area, and comparing such data with legitimate data from the same specified area of the legitimate bill having been stored in advance in storage means (ROM). At this time, provided that specified areas are predetermined according to the kind of the bill, predetermined weighting may be applied to the transmitted-light data and the reflected-light data from this specified area, thereby enabling improvement of the authenticity identification accuracy.

Further, in the second authenticity judgment process, image information on the both surfaces of the bill is acquired as pixel information along the bill traveling direction for example with the above-mentioned bill reading means 8, printing lengths on the respective surfaces are derived from the pixel information along the bill traveling direction, and then an authenticity judgment process is performed based on the thus-obtained printing lengths. This second authenticity judgment process is configured to eliminate the bill having different printing lengths from those of the legitimate bill since it is identified as counterfeit, and it is possible to further improve the identification accuracy of the bill by performing such authenticity judgment process.

Meanwhile, since a bill is used under various environments, the bill may expand or contract in their entirety (the bill is mainly made of fibrous materials such that it is considered that the bill may contract as it dehydrates after containing moisture in most cases.) As described above, it is desirable to perform the authenticity judgment process by acquiring printing lengths on both surfaces in consideration of improvement of the accuracy of the authenticity judgment, but it is also possible to judge even a legitimate bill as counterfeit (incorrect judgment process) unless the bill contraction is considered. Therefore, when the second authenticity judgment process is executed, an attempt is made not to perform such an incorrect judgment process by utilizing such a technique to be described later.

Then, since the above-mentioned bill reading means 8 is, to be described later, configured to perform the lighting control of the light emitting part with a predetermined interval and to comprise the line sensor which detects the transmitted light and the reflected light as the bill passes through, it is possible to acquire the image data based on the plurality of pieces of pixel information in a predetermined size as a unit by the line sensor.

In this case, the image data acquired by the line sensor is converted into data containing color information having brightness for each pixel by a converter which will be described later. In addition, the color information of each pixel having brightness to be converted by the converter corresponds to a contrasting density value, i.e., a density value (luminance value), and a numerical value from 0 to 255 (0: black to 255: white) is allocated to each pixel, for example, as information of one byte according to its density value.

Therefore, in the first authenticity judgment process, the predetermined area of the bill is extracted; the pixel information (density values) contained in the area and the pixel information in the same area of the legitimate bill are used so as to be substituted into an appropriate correlating equation; and then a coefficient of correlation is obtained by carrying out an operation thereof, thereby enabling the authenticity identification judgment by the coefficient. Or, in addition to the above description, analog waveforms, for example, are generated from the transmitted-light data and the reflected-light data, and the respective shapes of those waveforms are compared with each other, thereby enabling the authenticity identification judgment by such comparison.

Further, in the second authenticity judgment process, it is possible to obtain length data (actual measurement data) about the printed area from the image information acquired from both surfaces of the bill. In this case, as the image data acquired as the pixel information, one pixel, for example, may have a resolution of 0.508 mm or so in the longitudinal direction of the bill, depending on the resolution of the line sensor, and therefore, it is possible to eliminate what has the printing length different from the reference at least by 1 to 2 mm or so when the printing length is obtained from the total number of pixels in the traveling direction of the bill. Here, in order to further improve the identification accuracy based on the printing length, the resolution of the line sensor may be improved, but if the identification accuracy is too much improved, it is possible to eliminate what has a slight manufacturing error simply in printing such that it may be considered that the above-mentioned resolution is good enough.

Here, the configuration of above-mentioned reading means 8 will be described in detail with reference to FIGS. 2 and 3.

The abovementioned bill reading means 8 has a light emitting unit 80 which is installed on the side of the open/close member 2B and provided with a first light emitting part 80*a* capable of irradiating the upper side of the bill to be conveyed with the infrared light and the red light, and a light receiving/emitting unit 81 which is installed on the side of the main body frame 2A.

The light receiving/emitting unit 81 has a light receiving part 81*a* which is provided with a light receiving sensor facing the first light emitting part 80*a* across the bill and second light receiving parts 81*b* which are installed adjacently on the both sides of the light receiving part 81*a* along the bill traveling direction and are capable of irradiating the object with the infrared light and the red light.

The first light emitting part 80*a* disposed to face the light receiving part 81*a* works as a light source for the transmissive light. This first light emitting part 80*a* is, as shown in FIG. 2, comprised of a rectangular bar-like body made of synthetic resin which emits the light guided through a light guiding body 80*c* provided inside from an LED element 80*b* fixed to one end of the bar-like body. The first light emitting part having such a configuration is linearly installed in parallel with the light receiving part 81*a* (light receiving sensor) so as to be capable of entirely and equally irradiating the entire range in the width direction of the traveling route of the bill to be conveyed although the configuration is simple.

The light receiving part 81*a* of the light receiving/emitting unit 81 is formed in a thin-walled plate shape having a band shape extending in a lateral direction of the bill traveling route 3 and having a width to an extent that the sensitivity of the light receiving sensor (not shown) provided in the light receiving part 81*a* is not affected. In addition, the light receiving sensor is configured as a so-called line sensor in which a plurality of CCDs (Charge Coupled Devices) are provided linearly in the center in the thickness direction of the light receiving part 81*a*, and a GRIN lens array 81*c* is disposed linearly above these CCDs so as to collect the transmitted light and the reflected light. Therefore, it is possible to receive the transmitted light or the reflected light of the infrared light or the red light emitted from the first light emitting part 80*a* or the second light emitting parts 81*b* such that the bill serving as the object for authenticity judgment is irradiated with the infrared light or the red light, and generate contrasting density data according to its luminance (pixel data containing information of brightness) as the received-light data and a two-dimensional image on the basis of the contrasting density data.

The second light emitting part 80*b* of the light receiving/emitting unit 81 works as a light source for the reflection light. This second light emitting part 81*b* is, in a similar manner as the first emitting part 80*a*, comprised of a rectangular bar-like body made of synthetic resin which emits the light guided through a light guiding body 81*e* provided inside from an LED element 81*d* fixed to one end of the bar-like body. The second light emitting part 81*b* is also configured to be linearly installed in parallel with the light receiving part 81*a* (line sensor).

The second light emitting parts 81*b* are capable of irradiating the bill with the light at an elevation angle of 45 degrees, for example, and are so installed that the light receiving part 81*a* may receive the reflected light from the bill. In this case, the lights irradiated to the bill by the second light emitting parts 81*b* are to be made incident at 45 degrees onto the light receiving part 81*a*, but the incident angle is not limited to 45 degrees such that the arrangement may be re-arranged as appropriate as long as the lights are irradiated evenly without shading to the surface of the bill. Therefore, the arrangement of the second light emitting parts 81*b* and the light receiving part 81*a* may be appropriately changed in design in accordance with the structure of the bill processing apparatus. Further, the second light emitting parts 81*b* are disposed on the both sides of the light receiving part 81*a* so as to be disposed across it and irradiate the respective lights at respective incident angles of 45 degrees to the bill. This is because, in the case where the surface of the bill has scratches or folded wrinkles, and in the case where the light is irradiated only from one side to an uneven surface generated by these scratches or folded wrinkles, it is unavoidable to make some portions shaded to cause shadow in the uneven surface. Therefore, it is prevented that the shadow is made in the portion of the uneven surface by irradiating the bill with the lights from the both sides, whereby the image data to be acquired can have a higher degree of accuracy than that of the single side irradiation. However, the second light emitting part 81*b* may be installed only on one side to configure the apparatus.

In addition, the configuration, the arrangement, and the like of the light emitting unit 80 and the light receiving/emitting unit 81 as described above are not limited to those described in this embodiment, and may be modified as appropriate.

Figure 6:
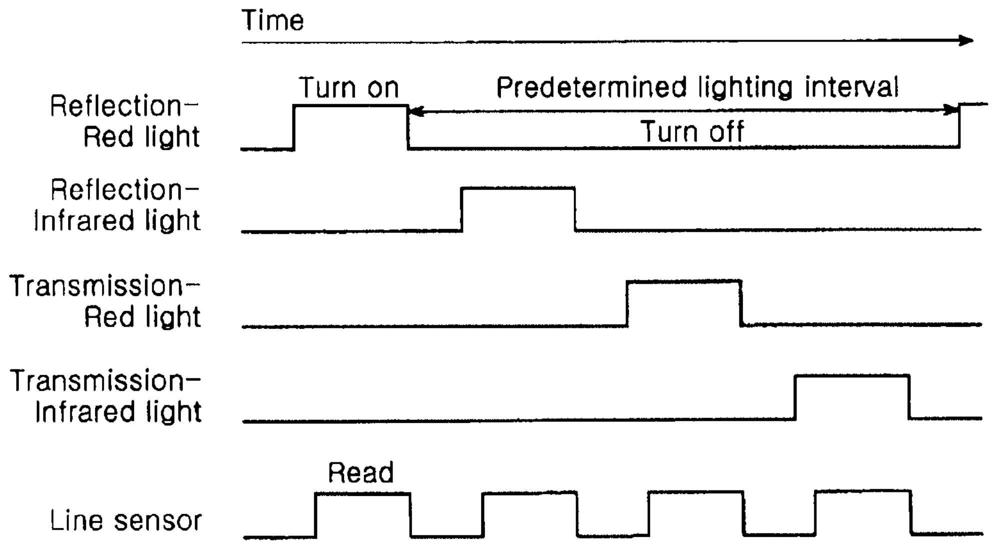
FIG. 6 shows a timing diagram illustrating lighting control of a light emitting part when the bill is read out with bill reading means.

Further, in the respective first light emitting part 80*a* and second light emitting part 81*b* in the above-described light emitting unit 80 and the light receiving/emitting unit 81, when the bill is read, as shown in a timing diagram of FIG. 6, an infrared light and a red light are controlled to be turned on and off with predetermined intervals. That is, lighting control is performed such that the four light sources constituted of the transmitting light sources of the red light and the infrared light and the reflecting light sources of the red light and the infrared light in the first light emitting part 80*a* and the second light emitting parts 81*b* repeatedly turn on and off the lights with a constant interval (predetermined lighting interval), and two or more of the light sources do not simultaneously turn on the lights without overlapping the on-phases of the respective light sources in any case. In other words, lighting control is performed such that, while any one light source is turned on, the other three light sources are turned off. Thereby, as described in this embodiment, it is possible even for the one light receiving part 81*a* to detect each light from each light source at a constant interval such that an image constituted of contrasting density data on a printed area of the bill can be read out by a transmitted light and a reflected light of the red light, and a transmitted light and a reflected light of the infrared light, and further it is possible to measure the printing lengths of both surfaces. In this case, it is also possible to improve the resolution by controlling the lighting interval to be shorter.

The bill housing part 100 which houses the above-described bill and the like is so configured as to stack and house sequentially bills identified as being genuine by the bill reading means 8.

As shown in FIGS. 3 to 5, the main body frame 100A constituting the bill housing part 100 is formed into a substantially rectangular parallelepiped (or cuboid) shape, and one end of bias means (e.g., bias spring) 106 is attached to an interior side of a front wall 102*a* thereof, and a placing plate 105 on which bills to be fed via the above-described receiving port 103 are sequentially stacked is provided to the other end thereof. Therefore, the placing plate 105 is in a state that it is pressed toward the presser plate 115, which will be described later, by the bias means 106.

In the main body frame 100A, a press standby part 108 that keeps a dropping bill as it falls is provided so as to continuously communicate with the receiving port 103. A pair of regulatory members 110 are disposed on both sides of the press standby part 108, respectively, the regulatory members 110 extending in a vertical direction. An opening is formed between the pair of regulatory members 110 such that the presser plate 115 passes through the opening as bills are successively stacked onto the placing plate 105.

Further, protruding walls are formed on both side walls inside the main body frame 100A such that the placing plate 105 may hit and contact thereon when the placing plate is pressed by the biasing means 106. When the placing plate is biased back by the biasing means 106 after bills are sequentially stacked on the placing plate 105, the protruding walls take a holding role to stably hold the stacked bills by hitting and contacting both sides of a surface of an uppermost bill of the stacked bills.

Further, the presser plate 115 that presses toward the placing plate 105 a bill falling into the press standby part 108 from the receiving port 103 is installed in the main body frame 100A. The presser plate 115 is formed in such a size that it may be capable of reciprocating through an opening formed between the pair of regulatory members 110, and gets into the opening so as to be driven to reciprocate between a position where the bills are pressed against the placing plate 105 (a pressing position) and another position where the press standby part 108 is opened (an initial position). In this case, the bill passes through the opening as being flexibly bent in a pressing operation of the presser plate 115 and is then placed on the placing plate 105.

The presser plate 115 is driven to reciprocate as described above via a presser plate driving mechanism 120 installed in the main body frame 100A. The presser plate driving mechanism 120 comprises a pair of link members 115*a* and 115*b* having respective ends thereof supported pivotally by the presser plate 115 so as to allow the presser plate 115 to reciprocate in an arrow A direction in FIGS. 3 and 4, and these link members 115*a* and 115*b* are connected in a shape of letter "X", and the other ends opposite to the respective ends are supported pivotally by a movable member 122 installed movably in a vertical direction (an arrow B direction). A rack is formed in the movable member 122, and a pinion constituting the presser plate driving mechanism 120 is geared (engaged) with the rack.

As shown in FIG. 4, a housing part side gear train 124 constituting the presser plate driving mechanism 120 is connected to the pinion. For this case, as shown in FIG. 4, in this embodiment, a driving source (a motor 20) and a main body side gear train 21 sequentially engaged with the motor 20 are installed in the above-described apparatus main body 2, and when the bill housing part 100 is mounted to the apparatus main body 2, the main body side gear train 21 is to be connected to the housing part side gear train 124. That is, the housing part side gear train 124 comprises a gear 124B installed on the same axis of the pinion and gears 124C, 124D to be engaged sequentially with the gear 124B, and when the bill housing part 100 is mounted to and demounted from the apparatus main body 2, the gear 124D is configured to be engaged with and disengaged from a final gear 21A of the main body side train 21.

As a result therefrom, the presser plate 115 is driven to reciprocate in the arrow A direction as the motor 20 installed in the apparatus main body 2 is driven to rotate so as to drive the main body side train 21 and in turn the presser plate driving mechanism 120 (the housing part side gear train 124, the rack installed onto the movable member 122, and the link members 115*a*, 115*b*, etc.).

Conveyor members 150 which are capable of touching the bill conveyed-in from the receiving port 103 are installed in the main body frame 100A. The conveyor members 150 take their own role to contact the bill conveyed-in so as to stably guide the bill to an appropriate position in the press standby part 108 (position where the bill can be stably pressed without causing the bill to be moved to the right or left side when the bill is pressed by the presser plate 115). In this embodiment, the conveyor members are constituted of belt-like members (hereafter called belts 150) installed so as to face the press standby part 108.

In this case, the belts 150 are installed so as to extend along the conveying-in direction with respect to the bill, and are wrapped around the pair of pulleys 150A and 150B supported rotatably on both ends in the conveying-in direction. Further, the belts 150 contact a conveyor roller 150C extending in an axis direction which is supported rotatably in the region of the receiving port 103, and the belts 150 and the conveyor roller 150C nip and hold the bill conveyed-in the receiving port 103 therebetween to guide the bill directly to the press standby part 108. Moreover, in this embodiment, the pair of belts 150 are provided on the right and left sides, respectively, across the above-described presser plate 115 in order to be capable of contacting the surface on left and right sides of the bill. Here, the belts 150 may be prevented from loosening by not only being wrapped around the pulleys 150A and 150B at the both ends, but also causing tension pulleys to push the belts 150 at the intermediate positions, respectively.

The pair of belts 150 are configured to be driven by the motor 13 that drives the above-described plurality of conveyor rollers installed in the apparatus main body 2. In detail, as shown in FIG. 5, the above-described driving belt 13B driven by the motor 13 is wrapped around a pulley 13D for the driving force transmission, and a gear train 153 installed at the end of the spindle of the pulley 150A supported rotatably on the receiving port 103 side is engaged with a gear train 13E for the power transmission sequentially installed onto the pulley 13D. That is, when the bill housing part 100 is mounted to the apparatus main body 2, an input gear of the gear train 153 is configured to be engaged with a final gear of the gear train 13E, and the pair of belts 150 are configured to be driven to rotate in a synchronized manner with the above-described conveyor rollers 14B, 15B, 16B, and 17B for conveying the bill by driving the motor 13 to rotate.

As described above, when the bill is inserted into the inside via the bill insertion slot 5, the bill is moved inside the bill traveling route 3 by the bill conveyance mechanism 6. As shown in FIG. 3, the bill traveling route 3 has the first traveling route 3A which is extended from the bill insertion slot 5 toward the back side, and the second traveling route 3B which is extended from the first traveling route 3A toward the downstream side and is inclined at a predetermined angle to the first traveling route 3A. A shutter member 170 that prevents the bill from being conveyed toward the bill insertion slot 5 by a fraudulent activity is installed in the second traveling route 3B.

Next, control means 200 that controls the driving of the bill conveyance mechanism 6, the bill reading means 8 and the like as mentioned above will be described with reference to a block diagram of FIG. 7.

Figure 7:
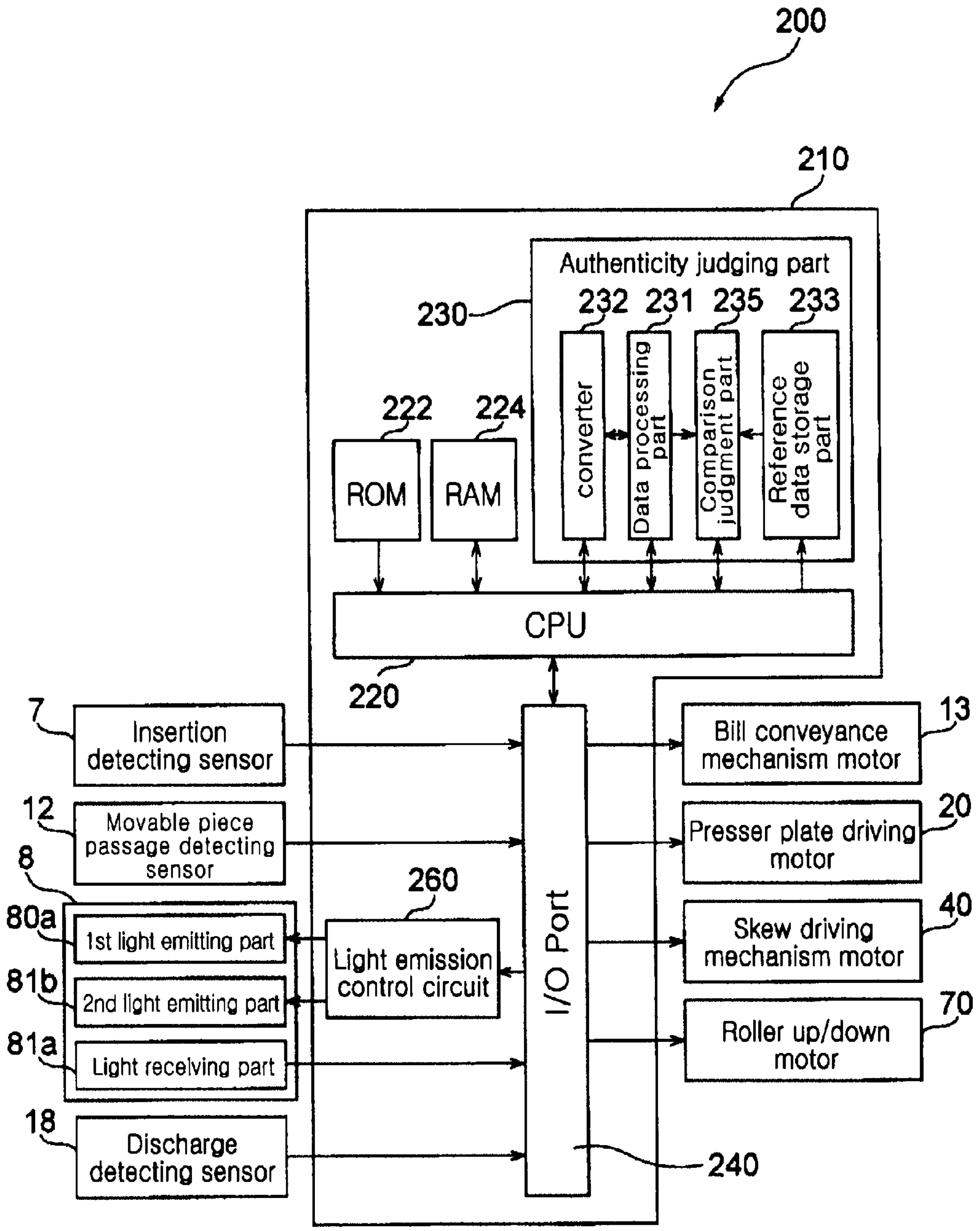

The control means 200 as shown in a block diagram of FIG. 7 comprises a control board 210 which controls the operations of the above-described respective drive units, and a CPU (Central Processing Unit) 220 controlling driving of each drive unit and constituting the bill identification means, a ROM (Read Only Memory) 222, a RAM (Random Access Memory) 224, and an authenticity judging part 230 are implemented on the control board 210.

In the ROM 222, permanent data such as various types of programs such as an authenticity judgment program in the authenticity judging part 230, operation programs for the respective drive units such as the motor 13 for the bill conveyance mechanism, the motor 20 for the presser plate, the motor 40 for the skew correction mechanism, and the roller up-and-down motor 70 for lifting up and down rollers, and the like are stored.

The CPU 220 operates according to the programs stored in the ROM 222, and carries out input and output of the signals with respect to the respective drive units described above via an I/O port 240, so as to perform the entire operational control of the bill processing apparatus. That is, the motor 13 for the bill conveyance mechanism, the motor 20 for the presser plate, the motor 40 for the skew correction mechanism, and the roller up-and-down motor 70 are connected to the CPU 220 via the I/O port 240, and the operations of these drive units are controlled by control signals transmitted from the CPU 220 in accordance with the operation programs stored in the ROM 222. Further, the CPU 220 is so configured that detection signals from the insertion detecting sensor 7, the movable piece passage detecting sensor 12, and the base part detecting sensor 18 are input into the CPU 220 via the I/O port 240, and the driving of the respective drive units is controlled based on these detection signals.

Moreover, the CPU 220 is so configured that a detection signal based on a transmitted light and a reflected light of the light which is irradiated to the identification object is input into the CPU 220 via the I/O port 240 from the light receiving part 81*a* in the bill reading means 8 as described above.

The RAM 224 temporarily stores data and programs used for the CPU 220 to operate, and also acquires and temporarily stores the received light data (image data constituted of a plurality of pixels) of the bill serving as the identification object.

The authenticity judging part 230 has a function to carry out the above-mentioned first authenticity judgment process and second authenticity judgment process with respect to a bill to be conveyed so as to identify the authenticity of the bill. The authenticity judging part 230 has a converter 232 which converts the received light data of the identification object stored in the RAM 224 into pixel information containing color information having brightness (density value) for each pixel, and a data processing part 231 having a function to process image data of the bill acquired from a reflected light and a transmitted light such that printing lengths of a conveyed bill are specified, or a correction process as will be described later is carried out on the basis of the printing lengths based on the pixel information converted by the converter 232.

Further, the authenticity judging part 230 has a reference data storage part 233 in which the reference data of the legitimate bill is stored, and a comparison judgment part 235 which compares comparison data, on which various types of data processes of a bill serving as an authenticity identification object are executed in the data processing part 231, with the reference data stored in the reference data storage part 233, so as to perform an authenticity judgment process. In this case, the reference data storage part 233 stores image data about the legitimate bill to be used when the above-mentioned first authenticity judgment process is carried out, reference values of the printing lengths of the legitimate bill to be used in the above-mentioned second authenticity judgment process, the allowable range data acceptable from the reference values, and so on.

In addition, the reference data is stored in the dedicated reference data storage part 233. However, the data may be stored in the above-mentioned ROM 222. Further, the reference value and the allowable range data which are referred to at the time of comparison may be stored in advance in the reference data storage part 233. However, for example, the received-light data, which is acquired as the predetermined number of legitimate bills are conveyed by the bill conveyance mechanism 6, may be stored in the reference data storage part 233 as the reference data.

Moreover, the CPU 220 is configured to be connected to the first light emitting part 80*a* and the second light emitting part 81*b* in the aforementioned bill reading means 8 via the I/O port 240. The first light emitting part 80*a* and the second light emitting parts 81*b* are controlled through a light emission control circuit 260 by a control signal from the CPU 220 in accordance with the operation programs stored in the abovementioned ROM 222 such that the lighting interval and the turning-off are controlled.

Next, an example of specific processing methods of the second authenticity judgment process as a feature of the present invention will be described.

As described above, the bill reading means 8 irradiates a bill conveyed by the bill conveyance mechanism 6 with light (red light and infrared light) from the first light emitting part 80*a* and the second light emitting parts 81*b*, and receives a transmitted light or a reflected light therefrom with the light receiving part (line sensor) 81*a*, so as to execute the reading of the bill. It is possible to acquire many pieces of pixel information for a predetermined size of pixel as a unit (for example, one pixel is 0.508 mm in the traveling direction) while the conveyance processing of the bill is conducted in the reading process, and the image data constituted of many pixels (plural pixels) acquired in this way is stored in a RAM 224. In addition, here, the image data constituted of many pixels being stored is converted into color information having brightness (color information to which a numerical value from 0 to 255 (0: black to 255: white) corresponding to each density value is allocated) for each pixel by the converter 232.

Figure 8:
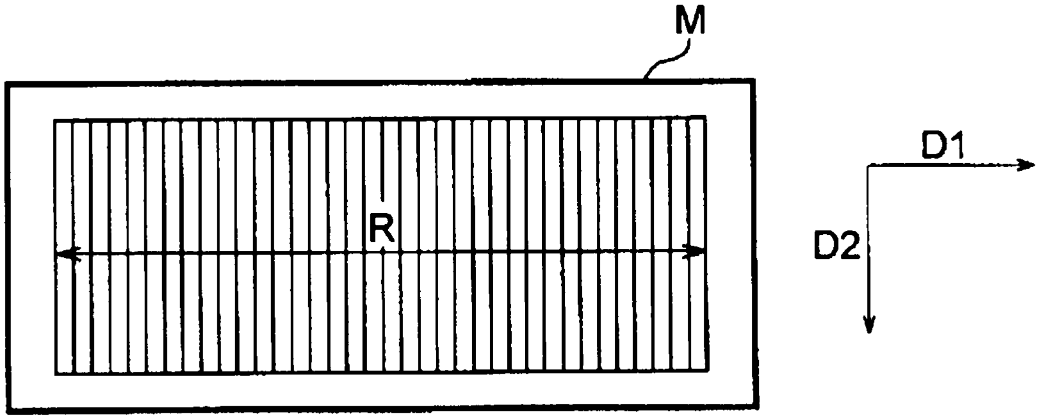
FIG. 8 is a schematic diagram illustrating a range where length data of a printed area of the bill is acquired.

In this way, by converting an image obtained by the line sensor into pixel information containing color information having brightness (density value) with the converter, it becomes possible to perform an actual measurement of the printing lengths on one surface and the other surface of the bill being conveyed. For example, as shown in FIG. 8, while the bill M is conveyed (conveyance in the D1 direction), the detection of the bill is moved from the non-printed area to the printed area such that a density value of the pixel information in the printed area may become low. Accordingly, provided that an average density value of the pixel information in the width direction D2 is measured and that its displacing positions are detected by setting a threshold value, it is possible to acquire actual measurement data of the printing lengths R in predetermined areas (here, corresponding to the entire printed area along the longitudinal direction) with respect to the both surfaces of the bill. Here, printed areas having maximum lengths are used as the measurement object. However, the measurement object is not limited thereto. Any image or the like in a printed area may be the object. A bill having a clear boundary line between a non-printed area and a printed area (background and measurement object image) is preferable. Further, printed areas (measurement object images) respectively shown on one surface and the other surface of the bill may be used.

Then, by utilizing the actual measurement data on the both surfaces of the bill acquired as described above, it is possible to set a reference value and an allowable range for the reference value on the basis of a predetermined number of legitimate bills. Since some deviations are generated even in the legitimate bill from the effect of misalignment or the like in printing, first, the reference value is determined with reference to many bills, and an allowable range to be acceptable as the legitimate bill is set on the basis of the reference value.

Here, based on a statistical view, an example of setting the reference value and the allowable range will be described. The reference value and the allowable range may be set by measuring printed areas of a plurality of bills in another apparatus or this apparatus may also be utilized to learn the setting by measuring a plurality of printed areas in advance with the apparatus. Moreover, such a reference value and an allowable range may be again calibrated after processing for a predetermined period of time or a predetermined number of bills.

For example, fifty legitimate bills are read by the bill reading means 8 so as to acquire the actual measurement data of their lengths. FIG. 9 shows an example of actual measurement data of the one surface of each of the fifty legitimate bills, and their lengths (X) are specified by the number of pixels (1 pixel; 0.508 mm). An average value ($\mu$) is obtained from the actual measurement data acquired in this way, the deviations ($X-\mu$) of the lengths of the printed areas in the respective bills are calculated, and a variance (an average of $(X-\mu)^2$) is calculated. Then, it is possible to set an allowable range therefor by acquiring a standard deviation ($\sigma$) from the acquired variance.

That is, with respect to the reference value of the printed area of the bill, it is possible to specify a value serving as the standard of variations of printed areas by specifying an average value ($\mu$) of many legitimate bills, and a range of the specified reference value $\pm 3\sigma$ is set as an allowable range in the present embodiment. It is a matter of course that the allowable range can be set arbitrarily in consideration of the preciseness of the counterfeit bill.

In the exemplification of the table as shown in FIG. 9, an average value ($\mu$) of predetermined printing lengths of the fifty legitimate bills, i.e., a reference value thereof is calculated to be 264.36, a variance thereof is calculated to be 10.27, and a standard deviation is calculated to be 3.20. Therefore, the average value and the standard deviation (one unit is a pixel) are stored as the reference data (dictionary data) in the reference data storage part 233. Then, a process to obtain such reference data with respect to the other surfaces thereof as well is executed, and the reference values and allowable ranges with respect to printing lengths are specified with respect to the predetermined printed areas on the both surfaces of the bills.

Figure 10:
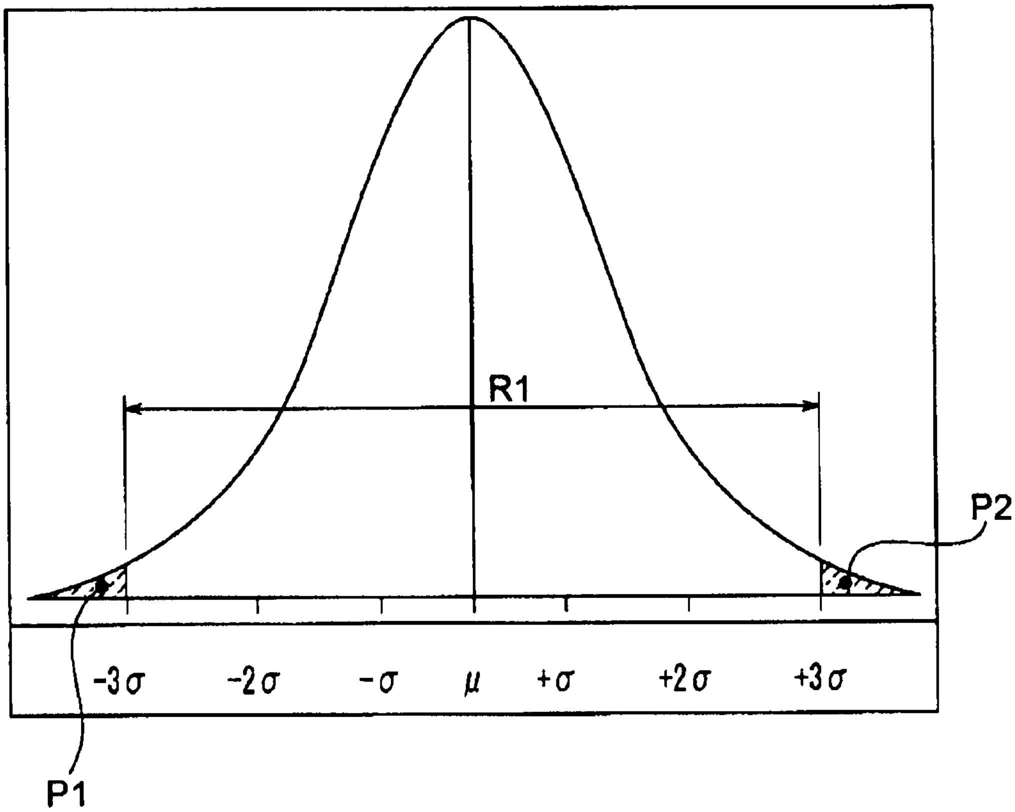
FIG. 10 is a diagram illustrating a distribution state of the actual measurement data of the bill to be sampled in an example as shown in FIG. 9.
Figure 11:
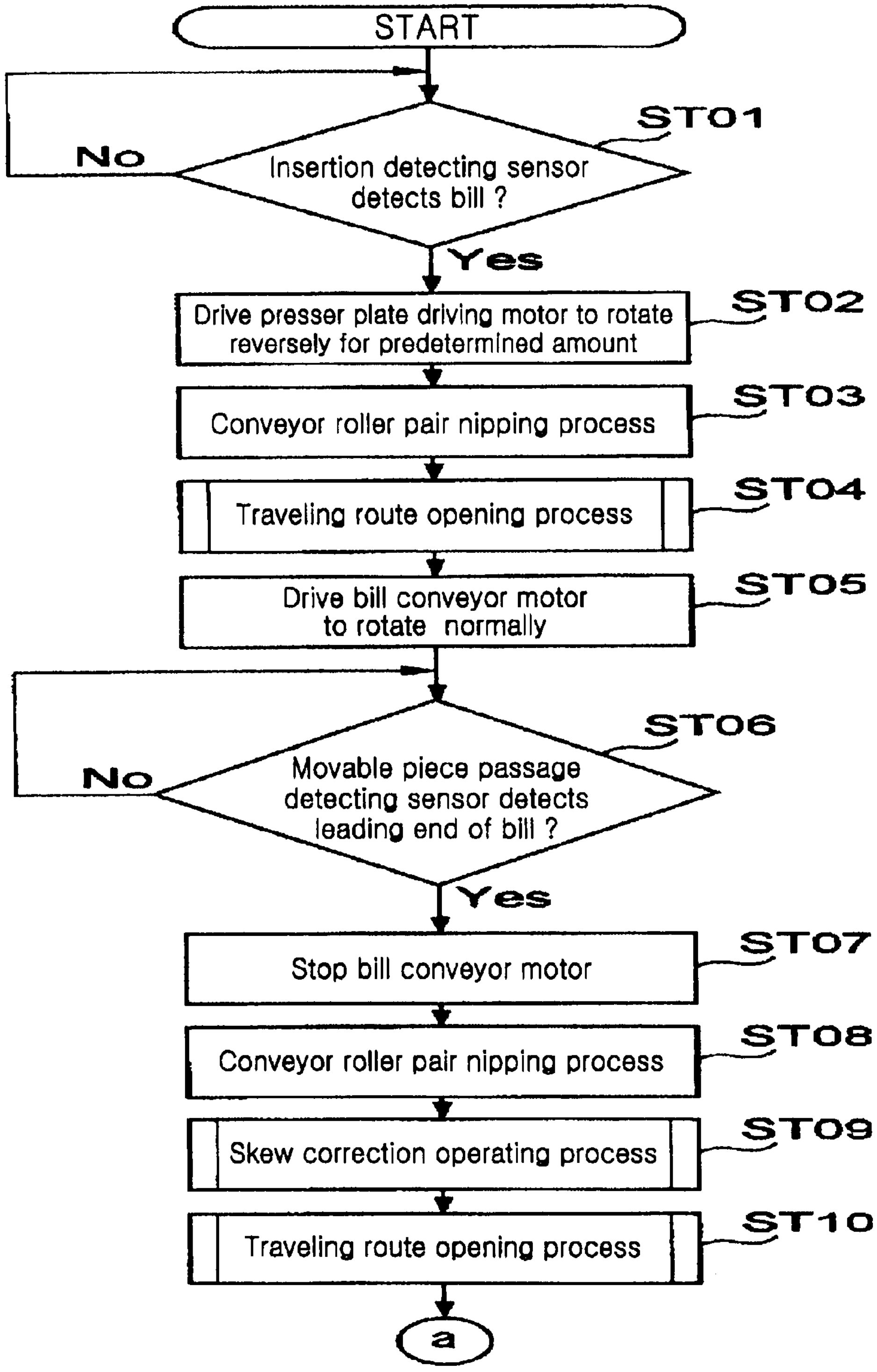
FIG. 11 shows a flowchart (part one) illustrating processing operations for processing the bill in the bill processing apparatus of this embodiment.
Figure 12:
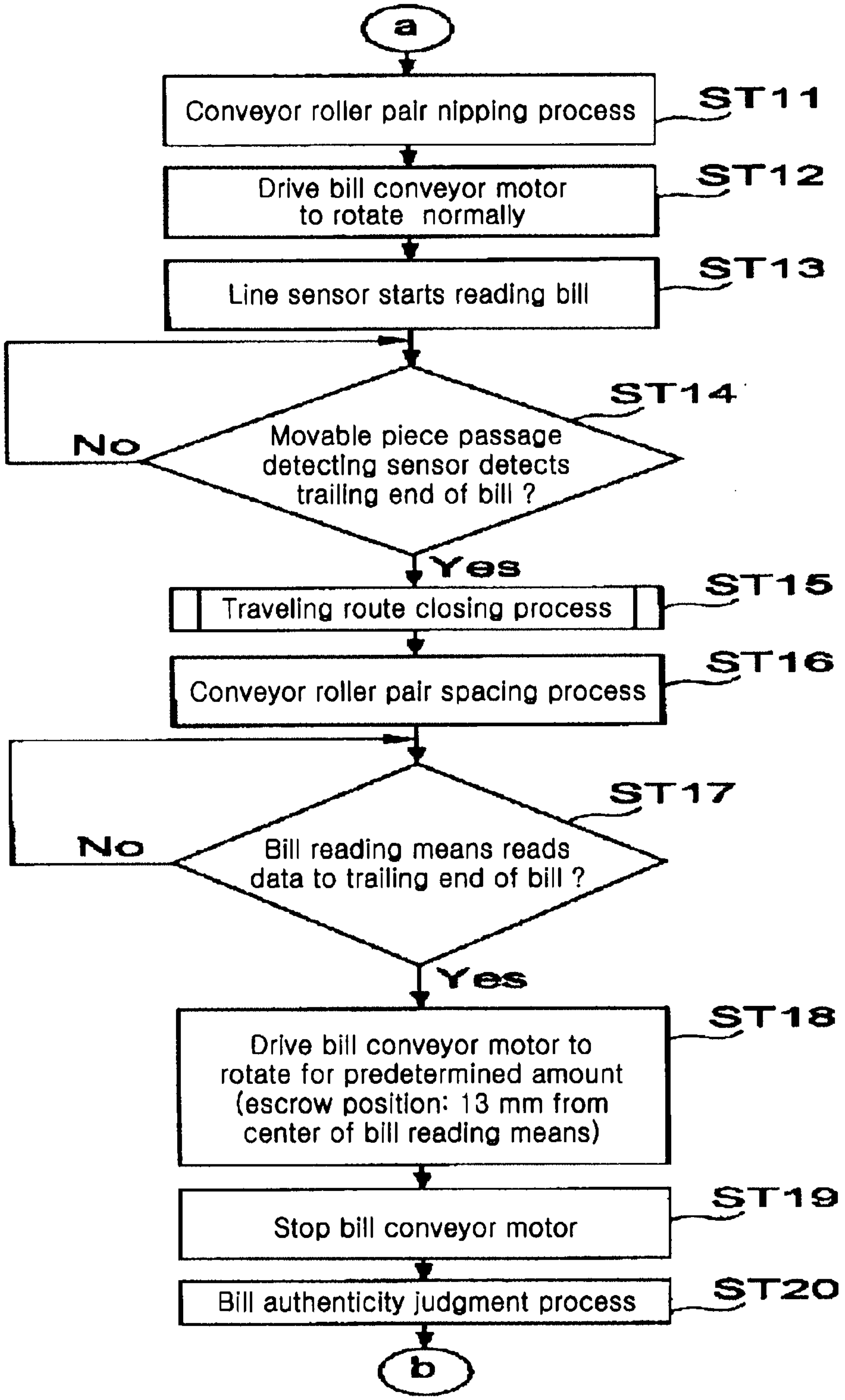
FIG. 12 shows a flowchart (part two) illustrating processing operations for processing the bill in the bill processing apparatus of this embodiment.
Figure 13:
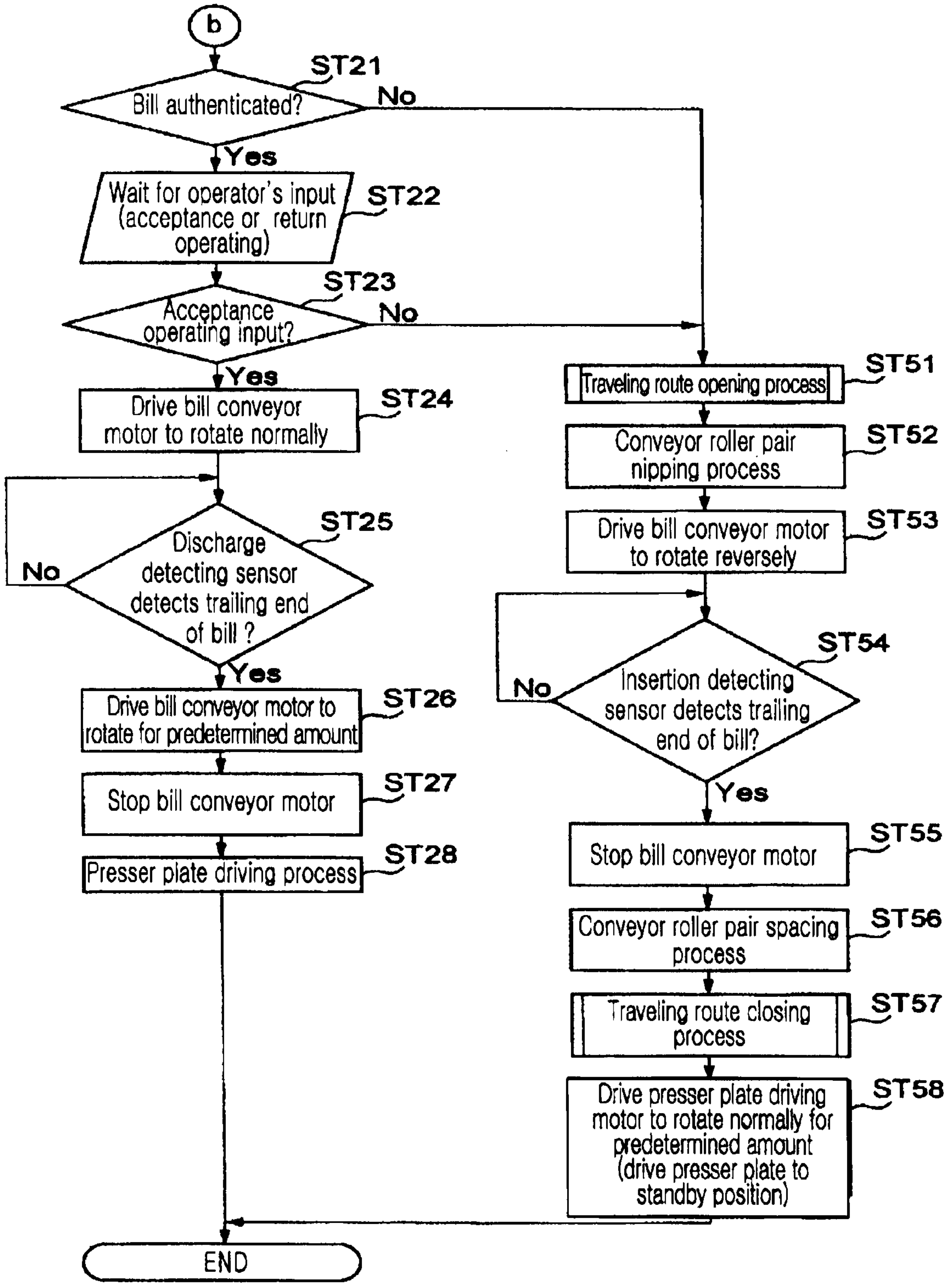
FIG. 13 shows a flowchart (part three) illustrating processing operations for processing the bill in the bill processing apparatus of this embodiment.
Figure 14:
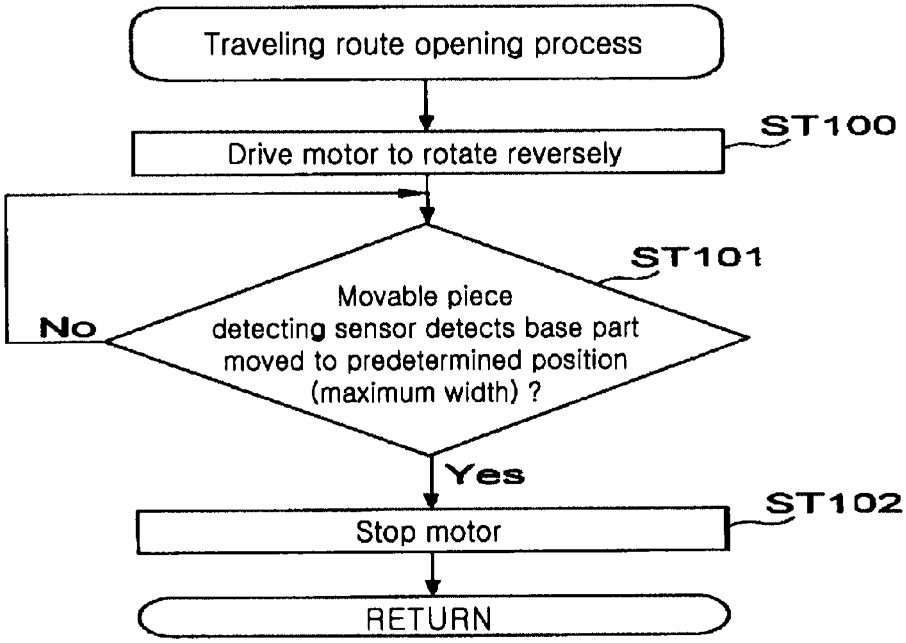
FIG. 14 shows a flowchart illustrating processing operations of a traveling route opening process.

FIG. 10 is a graph showing a variance state derived by the above-mentioned technique, and ($\mu \pm 3\sigma$) centering on ($\mu$) serving as the reference value is set as an allowable range R1.

Next, when a bill is actually conveyed and the authenticity of the bill is identified in the second authenticity judgment process, actual measurement data on the both surfaces of the bill is acquired in accordance with the same procedure as described above from the both sides of the bill passing through the bill reading means 8.

When the data actually measured on the both surfaces respectively fall within the allowable range R1 (respectively set for the both surfaces) of the graph shown in FIG. 10, the bill is judged as legitimate. Further, when the actual measurement data on one surface does not fall within the above-mentioned allowable range R1, an authenticity thereof is doubtful such that the correction process for the actual measurement on the other surface is conducted. In this case, for example, in a case where the bill being conveyed has contracted due to the effect of moisture or the like, even if it is the legitimate bill, its actual measurement data (on the surface) may be at a position as indicated by a point P1 in the graph of FIG. 10. Or, when the actual measurement data is located at such a point P1, this may be a case where its printing length may be shortened due to counterfeiting.

In this case, suppose the bill is the legitimate bill, as a contraction thereof is caused due to the effect of dehydration of the bill having contained moisture or the like, the printed area on the rear surface thereof as well contracts in the same way, and therefore, a correction process is performed with respect to the actual measurement data on the rear surface on the basis of the actual measurement data on the (front) surface and the corrected actual measurement data falls within the above-mentioned allowable range R1, whereby it is possible to judge the bill as legitimate. It is a matter of course that, in a case of a counterfeit bill whose actual measurement data of only the (front) surface exhibits short, the actual measurement data on the rear surface onto which the correction process is performed is supposed to be out of the allowable range R1.

To describe in detail with reference to the above-mentioned example, the actual measurement data on the (front) surface is in the area indicated by the point P1 or a point P2 in the graph as shown in FIG. 10, a correction value (r) for the (front) surface is calculated. This correction value (r) for the (front) surface can be derived by, for example, $[1+(L-\mu)/\mu]$ (L; an actual measurement value of the printed area on the (front) surface for this time, $\mu$; an average value of the printed areas of the (front) surfaces determined in advance).

Then, by carrying out a division process (L')/(r) with respect to the acquired correction value (r) with the actual measurement value (L') of the printed area on the rear surface, it is possible to derive a correction value (r') for the actual measurement data on the rear surface, and when the correction value (r') for the actual measurement data on the rear surface falls within the allowable range R1 ($\mu\pm3\sigma$) set in advance for the rear surface, it is evaluated that the rear surface contracts in the same way as the (front) surface thereof, and the bill is judged as legitimate. Then, in this correction process, when the correction value for the rear surface deviates from the allowable range R1, the bill is judged as counterfeit. In addition, the printed area on the rear surface as well may have the same length and may have the same statistical value as the printed area on the (front) surface. However, the rear surface may have a different length of the printed area and a different statistical value (average, standard deviation, or the like). Since the above-described correction value (r') is normalized by the average value $\mu$, even in the case where measurement objects with different lengths are selected, this correction value can be used directly.

In addition, a correction process as described above may be carried out when actual measurement data on one side is out of the allowable range R1. On the other hand, such a correction process may be carried out only when actual measurement data on one side is less than or equal to the allowable range R1 (in the area indicated by the point P1 in the graph of FIG. 10). That is, usually, since it is considered to be unlikely that the bill expands to stretch, in the case where the actual measurement data on one side is out of the allowable range R1 and greater than or equal to the allowable range R1 (the area indicated by the point P2 in the graph of FIG. 10), the bill may be immediately judged as counterfeit. With this configuration, it is possible to simplify the conduction of the correction process.

Next, the bill processing operation in the bill processing apparatus 1 executed by the control means 200 will be described according to the flowcharts of FIGS. 11 to 17.

When an operator inserts a bill into the bill insertion slot 5, the conveyor roller pair (14A and 14B) installed in the vicinity of the bill insertion slot is in a state that the rollers are spaced from each other in an initial stage (refer to ST16 and ST56 to be described later). Further, with respect to the presser plate 115, the pair of link members 115*a*, 115*b* driving the presser plate 115 are positioned in the press standby part 108, and the pair of link members 115*a*, 115*b* prevent the bill from being conveyed into the press standby part 108 from the receiving port 103. That is, in this state, the presser plate 115 is brought into the opening formed between the pair of regulatory members 110 such that the condition is so made as to prevent the bills stored in the bill housing part from being drawn out through the opening.

Moreover, the pair of movable pieces 10A constituting the skew correction mechanism 10 located on the downstream side of the conveyor roller pair (14A, 14B) are in a state that the pair of movable pieces 10A are moved to leave the minimum open width therebetween (for example, an interval between the pair of movable pieces 10A is 52 mm; refer to ST15 and ST57 to be described later) so as to prevent the bill from being drawn out in the initial stage.

In the initial state of the above-described pair of conveyor rollers (14A and 14B), it is possible for the operator to easily insert even a bill having wrinkles into the paper sheet insertion slot 5. Then, when insertion of the bill is detected by the insertion detecting sensor 7 (ST01), the driving motor 20 of the above-described presser plate 115 is driven to rotate reversely for a predetermined amount (ST02) to move the presser plate 115 to the initial position. That is, the presser plate 115 is in a state that the presser plate 115 is moved and remains in the opening formed between the pair of regulatory members 110 such that it is so arranged that the bill cannot pass through the opening until the insertion of a bill is detected by the insertion detecting sensor 7.

When the presser plate 115 is moved from the standby position to the initial position, the press waiting part 108 becomes in an open state (refer to FIG. 4) such that the apparatus is in a state that the bill can be conveyed into the bill housing part 100. That is, by driving the motor 20 to rotate reversely for a predetermined amount, the presser plate 115 is moved from the standby position to the initial position via the main body side gear train 21 and the presser plate driving mechanism 120 (the housing part side gear train 124, the rack formed on the movable member 122, and the link members 115*a*, 115*b*).

Further, the above-described roller up-and-down motor 70 is driven to move the upper conveyor roller 14A so as to make a contact with the lower conveyor roller 14B. In accordance therewith, the inserted bill is nipped and held therebetween by the pair of conveyor rollers (14A and 14B) (ST03).

Next, a traveling route opening process is conducted (ST04). The opening process is conducted by driving the pair of movable pieces 30A, 30B to move in separating directions so as to become apart with each other as the motor 40 for the skew correction mechanism is driven to rotate reversely as shown in the flow chart of FIG. 14 (ST100). At this time, when it is detected that the pair of movable pieces 10A have moved to the predetermined positions (the maximum open width positions) by the base part detecting sensor that detects positions of the pair of movable pieces 10A (ST101), the driving operation to rotate the motor 40 reversely is stopped (ST102). This traveling route opening process allows the paper sheet to enter between the pair of movable pieces 10A. In addition, in the previous step of ST04, the bill traveling route 3 is in a closed state by a traveling route closing process (ST15, ST57) to be described later. Thus, the bill traveling route 3 is closed in this way before an insertion of the bill so as to prevent an element such as a line sensor from being broken by, for example, inserting a plate-like member from the bill insertion slot for illicit purposes or the like.

Next, the bill conveyor motor 13 is driven to rotate normally (ST05). The bill is conveyed into the inside of the apparatus by the conveyor roller pair (14A and 14B), and when the movable piece passage detecting sensor 12 installed on the downstream side from the skew correction mechanism 10 detects the leading end of the bill, the bill conveyor motor 13 is stopped (ST06 and ST07). At this time, the bill is located between the pair of movable pieces 10A constituting the skew correction mechanism 10.

Next, the above-described roller up-and-down motor 71 is driven to allow the conveyor roller pair (14A and 14B) holding the bill therebetween to become apart from each other (ST08). At this time, the bill is in a state that no load is applied.

Figure 15:
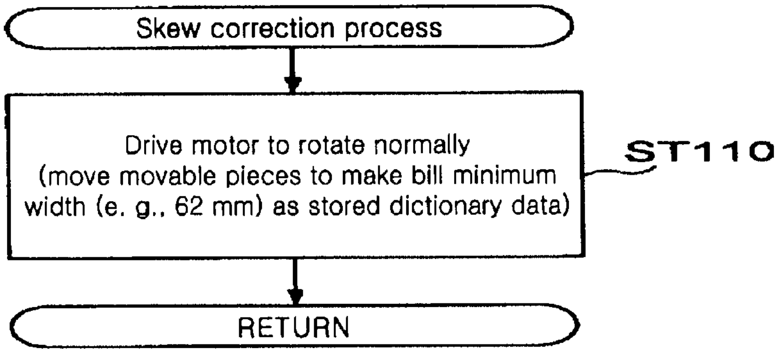
FIG. 15 shows a flowchart illustrating processing operations of a skew correction process.

Then, a skew correction operating process is executed as the bill remains in this state (ST09). The skew correction operating process is conducted by driving the motor 40 for the skew correction mechanism to rotate normally to drive the pair of movable pieces 10A to get closer with each other. That is, in this skew correction operating process, as shown in the flowchart of FIG. 15, the motor 40 described above is driven to rotate normally to move the pair of movable pieces 10A in respective directions such that the pair of movable pieces 10A get closer with each other (ST110). The movement of the movable pieces is continued until the distance therebetween becomes the minimum width (for example; width of 62 mm) of the bill registered in the reference data storage part in the control means. And the skew is corrected by the movable pieces 10A touching both sides of the bill such that the bill may be positioned at the accurate center position.

When the skew correction operating process as described above is completed, a traveling route opening process is subsequently executed (ST10). This process is conducted by moving the pair of movable pieces 10A in separating directions as the above-described motor 40 for the skew correction mechanism is driven to rotate reversely (refer to ST100 to ST102 of FIG. 14).

Next, the above-described roller up-and-down motor 70 is driven to move the upper conveyor roller 14A to contact the lower conveyor roller 14B, and the bill is nipped and held between the pair of conveyor rollers (14A and 14B) (ST11). Thereafter, the bill conveyor motor 13 is driven to rotate normally to convey the bill into the inside of the apparatus, and when the bill passes through the bill reading means 8, a reading process of the bill is executed (ST12 and ST13).

In the reading process of the bill, as shown in the timing diagram of FIG. 6, lighting control is performed such that the four light sources constituted of the transmitting light sources of the red light and the infrared light and the reflecting light sources of the red light and the infrared light in the above-mentioned first light emitting part 80*a* and the second light emitting parts 81*b* repeatedly turn on and off the lights with a constant interval, and two or more of the light sources do not simultaneously turn on the lights even without overlapping the on-phases of the respective light sources in any case. In other words, lighting control is performed such that, while any one light source is turned on, the other three light sources are turned off. Thereby, as described in this embodiment, it is possible even for the one light receiving part 81*a* to detect each light from each light source at a constant interval such that an image constituted of contrasting density data on a printed area of the identification object can be read out by a transmitted light and a reflected light of the red light and a transmitted light and a reflected light of the infrared light.

Figure 16:
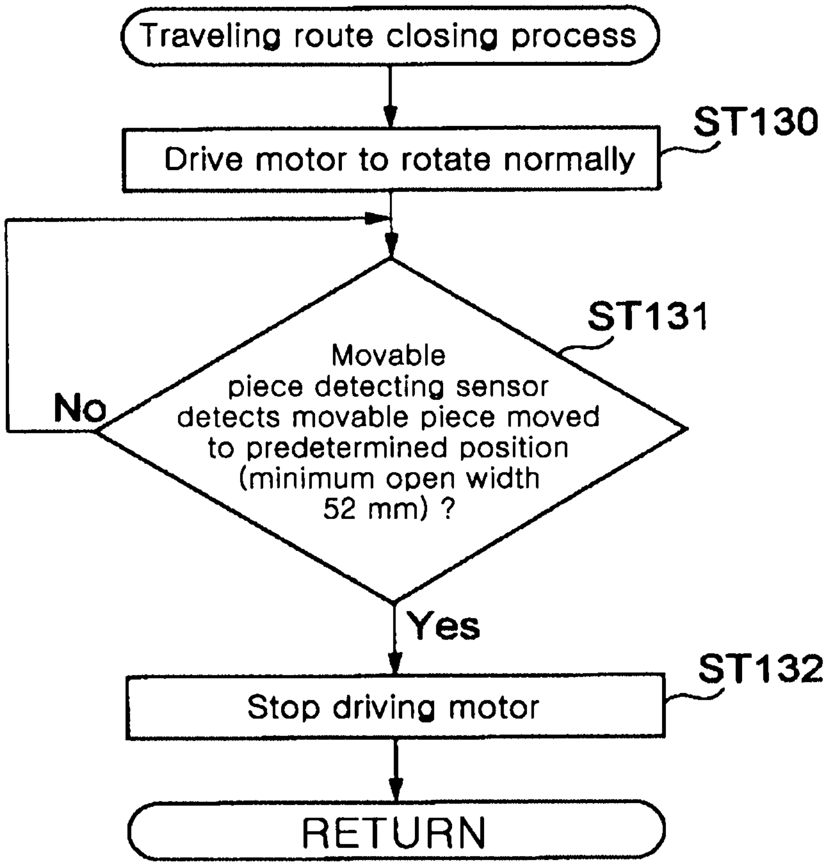
FIG. 16 shows a flowchart illustrating processing operations of a traveling route closing process.

Then, when the bill to be conveyed passes through the bill reading means 8, and the trailing end of the bill is detected by the movable piece detecting sensor 12 (ST14), a process for closing the bill traveling route 3 is executed (ST15). In this process, first, as shown in the flowchart of FIG. 16, after the trailing end of the bill is detected by the movable piece detecting sensor 12, the above-described motor 40 is driven to normally rotate to move the pair of movable pieces 10A in the directions that they get closer to each other (ST130). Next, when it is detected by the movable piece detecting sensor that the movable pieces 10A move to the predetermined positions (minimum open width positions: for example, width of 52 mm) (ST131), the driving operation of the normal rotation of the motor 40 is stopped (ST132).

With this traveling route closing process, the pair of movable pieces 10A are moved to the positions of the minimum open width (width of 52 mm) narrower than the width of any bill allowed to be inserted, thereby effectively preventing the bill from being drawn out. That is, by executing such a bill traveling route closing process, an opening distance between the movable pieces 10A is made shorter than the width of the inserted bill, thereby enabling the effective prevention of an action of drawing-out the bill in the direction toward the insertion slot by the operator for illicit purposes.

In addition, when the movable piece detecting sensor as described above detects the movement of the movable pieces 10A in this state, it may be considered that the operator is committing some fraudulent activities such that a predetermined processes may be executed. For example, a fraudulent manipulated signal (an anomaly sensed signal) may be transmitted to a higher-level apparatus that manages the operations of the bill processing apparatus, or an annunciator lamp may be provided on the bill processing apparatus, and this lamp may blink, or without activating a process for input acceptance (ST22) input by another operator thereafter, a process in which a discharge operation or the like is forcibly conveyed out may be executed. Or, appropriate processes such as canceling the operation of the bill processing apparatus (for example, a process for stopping the processing, a process for discharging the bill, and the like) and the like may be executed.

Further, in succession to the traveling route closing process described above (ST15), a conveyor roller pair spacing process is executed such that the above-mentioned roller up-and-down motor 70 is driven to make the conveyor roller pair (14A, 14B) having been in a state capable of nipping and holding the bill therebetween separate from each other (ST16). By executing the conveyor roller pair spacing process, even if the operator additionally inserts (double insertion) another bill by mistake, the bill is not subject to a feeding operation by the conveyor roller pair (14A, 14B) and hits front ends of the pair of movable pieces 10A in a closed state according to ST15 such that it is possible to reliably prevent the operation of bill double-insertion.

Along with the bill traveling route closing process as mentioned above, when the bill reading means 8 reads the data up to the trailing end of the bill, the bill conveyor motor 13 is driven for a predetermined amount and stops the bill in a predetermined position (an escrow position; a position where the bill is conveyed toward the downstream by 13 mm from the center position of the bill reading means 8), and at this time, an authenticity judgment process of the bill is executed in the comparison judgment part 235 by referring to the reference data stored in the reference data storage part 233 in the authenticity judging part 230 of the aforementioned control means 200 (ST17 to ST20).

Figure 17:
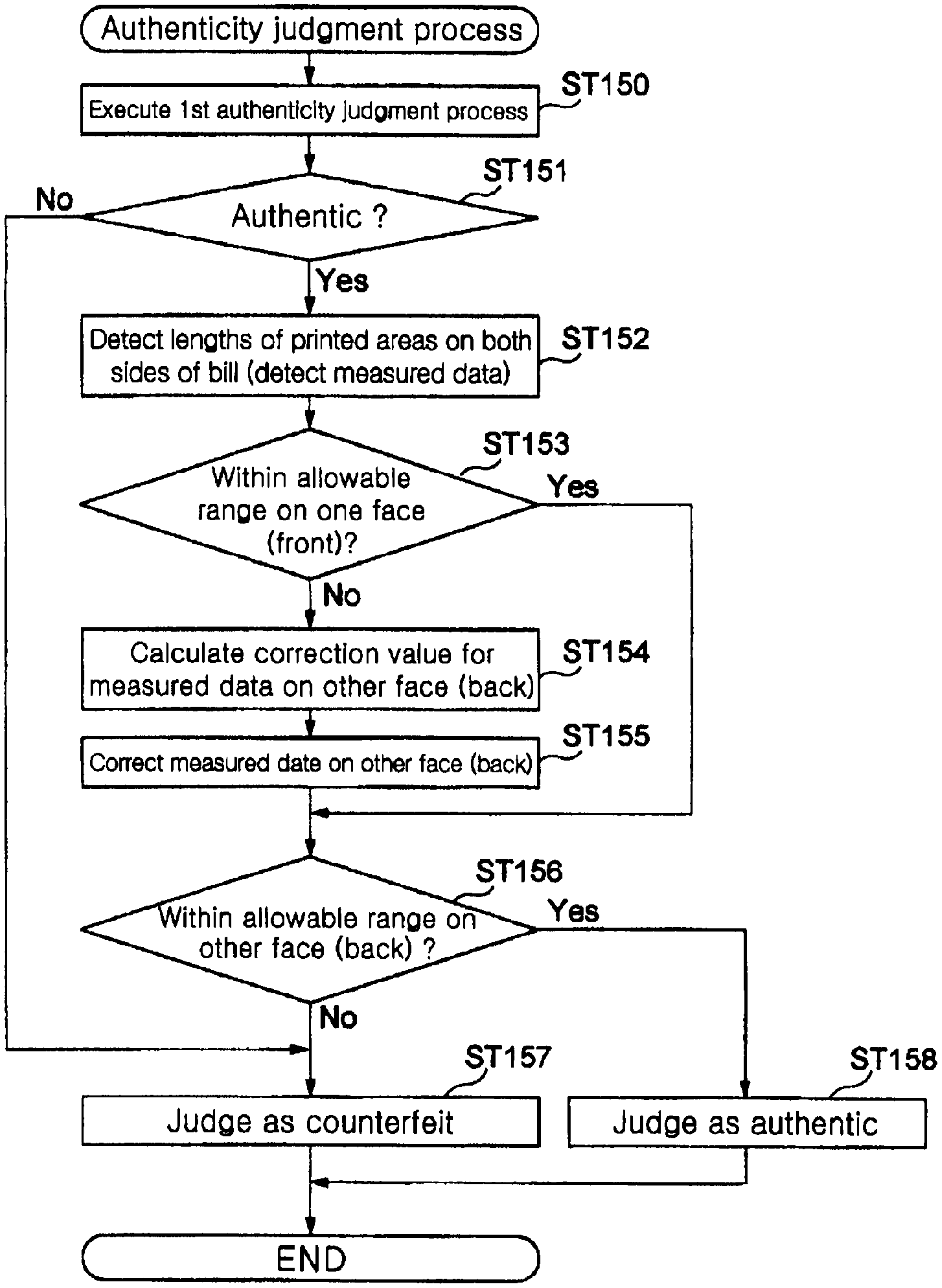
FIG. 17 shows a flowchart illustrating processing operations of a bill authenticity judgment process.

In this authenticity judgment process, first, as shown in a flowchart of FIG. 17, the aforementioned first authenticity judgment process is executed (ST150). In the case where the bill is judged as authentic in this first authenticity judgment process (ST151; Yes), the following second authenticity judgment process, i.e., an authenticity judgment process based on printing lengths is carried out, and in the case where the bill is judged as counterfeit in the first authenticity judgment process (ST151; No), the bill is judged as counterfeit without executing the second authenticity judgment process, to complete the process (ST157).

In the second authenticity judgment process, first, the lengths of the predetermined printed areas on the both surfaces of the bill (actual measurement data on the both surfaces) are detected by the bill reading means 8 (ST152). Next, it is judged whether or not the actual measurement data on one surface (which is assumed as the (front) surface) falls within the allowable range R1 set for the (front) surface as shown in the graph of FIG. 10 (ST153). When the actual measurement data on the one surface falls within the allowable range R1 (ST153; Yes), next, in the same way, it is judged whether or not the actual measurement data on the other surface (rear surface) as well falls within the allowable range R1 set for the rear surface as shown in the graph of FIG. 10 (ST156). Then, when the actual measurement data on the other surface falls within the allowable range R1 (ST156; Yes), the bill is judged as legitimate (ST158).

On the other hand, in ST153 described above, when the actual measurement data on the one surface (which is assumed as the (front) surface) does not fall within the allowable range R1 set for the surface (ST153; No), a correction value (r) for the (front) surface is calculated in accordance with the aforementioned technique, for example (ST154). Then, a correction process is performed with respect to the actual measurement value of the printed area on the rear surface on the basis of the obtained correction value (r) for the surface (ST155), and it is judged whether the actual measurement data is within the allowable range on the basis of the corrected actual measurement value (ST156). When the value corrected for the actual measurement data on the rear surface falls within the allowable range R1 set in advance for the rear surface, it is evaluated that the rear surface expands or contracts in the same way as the (front) surface thereof, and the bill is judged as legitimate (ST156; Yes, ST158). On the other hand, in this correction process, when the correction value for the rear surface deviates from the allowable range R1, the bill is judged as counterfeit (ST156; No, ST157).

As described above, by carrying out the authentic judgment process based on printing lengths of printed areas of the bill, it is possible to further improve the accuracy of the bill authenticity judgment, and even in a case where the bill is authentic and a expansion is caused thereto, it is possible to appropriately perform the authenticity judgment process.

Then, in the bill authenticity judgment process in ST20 as described above, as the bill is judged as the legitimate bill (ST21; Yes), an input from the operator is received (ST22). This input corresponds to an acceptance operation in which the operator presses an acceptance button in order to accept provision of services (for example, in the case of a gaming device, an acceptance process accompanied by start of a game), and a return operation in which the operator presses a return button in order to execute a process for returning the inserted bill.

Then, when an operation to accept the provision of various types of services is input (ST23; Yes), the bill conveyor motor 13 is consecutively driven to rotate normally to convey the bill in this state toward the bill housing part 100 (ST24).

At the time of conveying the bill of processing ST24, the bill conveyor motor 13 is driven to rotate normally until the trailing end of the bill is detected by the discharge detecting sensor 18 (ST25), and after the trailing end of the bill is detected by the discharge detecting sensor 18, the bill conveyor motor 13 is driven to rotate normally for the predetermined amount (ST26 and ST27).

The process for driving the bill conveyor motor 13 to rotate normally in ST26 and ST27 corresponds to a driving amount for which the bill is conveyed in the receiving port 103 of the bill housing part 100 from the discharge slot 3*a* on the downstream side of the bill traveling route 3 of the apparatus main body 2 so that the pair of belts 150 contact the surface on both sides of the conveyed-in bill to guide it stably to the press standby part 108. That is, by further driving the bill conveyor motor 13 to rotate normally for a predetermined amount after the trailing end of the bill is detected by the discharge detecting sensor 18, the pair of belts 150 contact the bill conveyed-in and are driven in the feeding direction so as to guide the bill in a stable state to the press standby part 108.

Then, after the above-described bill conveyor motor 13 is stopped, the process for driving the presser plate 115 is executed (ST28) such that the bill is placed on the placing plate 105. And, after the pressing process is completed, the presser plate 115 is again moved to the standby position and stopped to the position.

Further, in the above-mentioned process of ST21, when the bill is judged as a non-legitimate one (ST21; No) or the operator presses the return button (ST23; No), a traveling route opening process is executed (ST51, refer to ST100 to ST102 of FIG. 14). After that, the bill conveyor motor 13 is driven to rotate reversely and the conveyor roller pair (14A, 14B) are brought into contact with each other such that the bill waiting at the escrow position is conveyed toward the bill insertion slot 5 (ST52 and ST53). Then, when the insertion detecting sensor 7 detects the trailing end of the bill to be returned toward the bill insertion slot 5, the driving to reversely rotate the bill conveyor motor 13 is stopped, and above-described roller up-and-down motor 70 is driven to make the conveyor roller pair (14A and 14B) in a state of nipping and holding the bill therebetween separate from each other (ST54 to ST56). After that, the traveling route closing process is executed (refer to ST57, and ST130 to ST132 in FIG. 16) and the driving motor 20 for the presser plate 115 is driven to rotate normally (ST58) such that the presser plate 115 positioned at the initial position is driven to move to the standby position, and then a series of processes are completed.

According to the abovementioned configuration of the bill processing apparatus 1, since the authenticity judgment process based on printing lengths of the bill is executed, it is possible to make an attempt to improve the authenticity judgment accuracy, and at the time of executing such the authenticity judgment process based on printing lengths of the bill, even in a case where an expansion or contraction is caused to the bill, it is possible to accurately perform the authenticity judgment.

As mentioned above, the embodiment of the present invention is described. However, the present invention is not limited to the above-described embodiment, and various modifications of the present invention can be implemented.

As described above, the present invention has a feature in which length information (actual measurement data) is acquired by specifying printed areas from the both surfaces of a bill, and a bill authenticity identification (second authenticity judgment process) is performed on the basis of the actual measurement data (onto which a correction process is carried out if necessary), and the other configurations are not limited to those in the above-described embodiment. Therefore, the concrete identification method in the first authenticity judgment process, the configuration of the bill reading means (which may be another configuration than the line sensor), and the mechanisms for driving the various types of driving members may be appropriately modified.

Further, the method for acquiring length data and areas (lengths) to be acquired described above may be appropriately modified. For example, the apparatus may be configured to acquire length data only on an area watermarked in a bill.

Moreover, various techniques may be used for a method of setting an allowable range of actual measurement data of a printed area and the allowable range itself. For example, in the above-mentioned embodiment, a predetermined number of legitimate bills are read by the bill reading means 8, and reference values and allowable ranges are derived on the basis of a statistical view from the image data on the respective bills read. However, reference values and allowable ranges may be set in advance, and those may be stored in the reference data storage part.

According to the bill processing apparatus of the above-mentioned embodiment, an allowable range acceptable from a reference value serving as a standard of length of a printed area is stored for each surface of a bill in advance in the allowable range storage part. Then, when a bill is actually inserted into the bill processing apparatus, read data (actual measurement data) on the lengths of the printed areas printed on the both surfaces of the bill is acquired by the bill reading means. In this case, when the actual measurement data on the length of the printed area on one surface of the bill is out of the allowable range for that surface, a correction process is performed with respect to the actual measurement data on the length of the printed area acquired from the other surface on the basis of the actual measurement data. Then, since the actual measurement data corrected by the correction process is compared with the allowable range for the other surface stored in the allowable range storage part to execute an authenticity judgment process, it is possible to perform an accurate authenticity judgment even when the bill is caused to expand or contract.

Meanwhile, when the actual measurement data on the length of the printed area on the one surface of the bill acquired by the bill reading means is within the allowable range for that surface, the actual measurement data on the other surface is compared with the allowable range for that surface without correcting the actual measurement data, to perform an authenticity judgment process.

Further, the comparison judgment part is capable of executing the authenticity judgment process when the actual measurement data on the one surface is less than or equal to the allowable range for that surface.

In a case where a bill dehydrates to contract after containing moisture or the like, the actual measurement data on the one surface may be less than or equal to the allowable range for that surface. Usually, when one surface of a bill contracts, the other surface as well contracts at the same or similar rate. In the above-mentioned configuration, in such a case, a correction is performed with respect to the actual measurement data on a length of a printed area acquired on the other surface on the basis of the actual measurement data on one surface, so as to perform an authenticity judgment process for the bill. Therefore, when a bill contracts, it is possible to perform appropriate determination.

Further, the reference values may be set such that lengths of printed areas on the both surfaces of a plurality of authentic bills are extracted, and average values of the lengths of the printed areas on the respective surfaces are determined.

Usually, even a legitimate bill has variations in its printed area due to an error in manufacturing thereof. As described above, provided that the reference values serving as standards for allowable ranges are average values of lengths of printed areas acquired from a plurality of legitimate bills, it is possible to perform more accurate authenticity determination.

Further, the authenticity judgment method of the above-mentioned embodiment comprises: an allowable range specifying step of specifying in advance an allowable range acceptable from a reference value as a standard of a length of a printed area for each surface of a bill; a correction processing step of conducting a correction process of actual measurement data of a length with respect to a printed area acquired on the other surface based on actual measurement data when actual measurement data acquired with respect to a printed area on one surface of the bill is out of the allowable range; and a comparison judging step of executing an authenticity judgment process by comparing an allowable range having been specified in advance on the other face with corrected actual measurement data of the other surface obtained in the correction processing step.

According to the authenticity judgment method of the above-mentioned embodiment, actual measurement data are acquired respectively with respect to lengths of the printed areas printed on both surfaces of the bill when the authenticity judgment is performed. In this case, the allowable range acceptable from a reference value as the standard of the length of the printed area is specified for each surface of the bill, and when actual measurement data of the printed area on one surface of the bill is out of the allowable range, actual measurement data of the length of the printed area acquired on the other surface is subject to a correction process on the basis of the actual measurement data. The corrected actual measurement data is compared with the allowable range on the other surface having been stored so as to execute the authenticity judgment process whereby an accurate authenticity judgment can be performed even if the bill is subject to the contraction.

Further, when the actual measurement data of the length of the printed area acquired on the one surface of the bill is equal to or less than the allowable range and the corrected actual measurement data on the other surface obtained in the correction processing step is within the allowable range of the other surface, the bill can be judged as legitimate.

In a case where a bill dehydrates to contract after containing moisture or the like, the actual measurement data on the one surface may be less than or equal to the allowable range for the surface. Usually, when one surface of the bill contracts, the other surface as well contracts at the same or similar rate. In the above-mentioned configuration, in such a case, a correction is performed with respect to the actual measurement data on a length of a printed area acquired on the other surface on the basis of the actual measurement data on the one surface, and the bill is judged as legitimate when the corrected actual measurement data is within the allowable range for the other surface. Therefore, it is possible to perform appropriate determination even when a bill contracts.

Further, when the actual measurement data of the length of the printed area acquired on the one surface of the bill is within the allowable range for the one surface, and the actual measurement data of the length of the printed area acquired on the other surface of the bill is out of the allowable range, the bill can be judged as counterfeit.

In such a configuration, when the actual measurement data on the lengths acquired with respect to the printed area on the one surface of the bill is within the allowable range for the one surface, the contraction or expansion of the bill is not supposed to occur. Therefore, when the actual measurement data on the other surface is out of the allowable range, it is possible to judge the bill as counterfeit, and there is no need to carry out the correction process, thereby enabling the authenticity judgment process to be simplified.

Further, the reference value serving as a standard of length of a printed area specified for each surface of the bill may be determined such that lengths of printed areas on the both surfaces are extracted from a plurality of legitimate bills, and an average value of the printed areas on each surface is determined. Then, not only the lengths of the printed areas, but also first and second objects serving as reference lengths which can be optically measured may be measured. For example, these appear on the first and second surfaces of the bill, respectively, and therefore, the lengths of the first and second objects are measured in first and second actual measuring processes. Next, it is judged in a first judgment process whether an actual measurement length in the first actual measuring process is within a predetermined allowable range (first allowable range) as compared with a predetermined reference value. When it is judged that it is within the allowable range, it is judged in the second judgment process whether an actual measurement length in the second actual measuring process is within a predetermined allowable range (second allowable range). Further, when it is judged in the first judgment process that it is out of the allowable range, after a correction step of correcting the actual measurement length in the second measuring process by use of a predetermined relationship, it is judged in the second judgment process whether the corrected actual measurement length in the second actual measuring process is within the predetermined allowable range as compared with the predetermined reference value. Here, the correction is to carry out a proportional calculation of the first actual measurement length and the reference length determined in advance (an average from a plurality of legitimate bills). That is, since the first and second objects respectively appearing on the first and second surfaces of the bill are expected to expand or contract in the same or similar way, the second actual measurement length is divided by this expansion and contraction ratio. Then, in any case, when it is judged in the second judgment process that it is within the predetermined allowable range as compared with the predetermined reference value, it is possible to judge the bill legitimate.

Usually, more or less deviation even for the legitimate bill is expected to be generated by a manufacturing error. Usually, such deviation may be generated in a cutting process of the bill (cutting error or the like), or generated in intaglio printing (printing error or the like). However, the deviation in the printing process in the latter case is smaller than that in the cutting process in the former case. Therefore, if the printed area with a small deviation is made to be the standard, that is, if the reference value as the standard for the allowable range is set to be an average value of the length of the printed area obtained from the plurality of legitimate bills, an authenticity judgment can be performed more accurately. In addition, it is possible to read the lengths of these printed areas (or first and second objects) simultaneously while the bill is conveyed. Further, since an expansion or contraction of a bill is usually slight, the lengths of the printed areas (or first and second objects) are preferably longer in order to precisely determine the expansion and contraction ratio, and an image or the like appearing in the longitudinal direction of the bill is preferably set as the actual measurement object.

According to the present invention, a bill processing apparatus which is capable of carrying out an authenticity judgment of a bill and an authenticity judgment process method employed in such a bill processing apparatus can be provided.

The present invention can be incorporated into various types of apparatuses to provide products and services by inserting a bill thereinto, for example.

What is claimed is:

1. A bill processing apparatus comprising:

a bill reading unit which reads a bill;

an allowable range storage part which stores an allowable range acceptable from a reference value as a standard of a length of a printed area of each of first and second surfaces of a bill;

a comparison judgment part which executes an authenticity judgment process when actual measurement data of a length of a printed area of the first surface of the bill read by the bill reading unit is out of the allowable range for the first surface, a correction value with respect to the actual measurement data of the first surface is calculated such that actual measurement data of the second surface is corrected with the calculated correction value, and the authenticity judgment process is performed by comparing the corrected actual measurement data of the second surface with an allowable range for the second surface, which is stored in the allowable ranged storage part.

2. The bill processing apparatus according to claim 1, wherein the comparison judgment part executes the authenticity judgment process when the actual measurement data on the first surface is equal to or less than the allowable range for the first surface.

3. The bill processing apparatus according to claim 1, wherein: lengths of printed areas on the first and second surfaces are extracted from a plurality of legitimate bills, and the reference value is an average value of the lengths of the printed areas on the first and second surfaces of the plurality of legitimate bills.

4. An authenticity judgment method comprising:

an allowable range specifying step of specifying, in advance, an allowable range acceptable from a reference value as a standard of a length of a printed area of each of first and second surfaces of a bill;

a correction processing step of conducting a correction process when actual measurement data acquired with respect to a length of a printed area on the first surface of the bill is out of the allowable range for the first surface, the correction process being conducted upon actual measurement data of a length with respect to a printed area acquired on the second surface based on the actual measurement data for the first surface; and a comparison judging step of executing an authenticity judgment process by comparing the corrected actual measurement data of the second surface obtained in the correction processing step with an allowable range having been specified in advance for the second surface.

5. The authenticity judgment method according to claim 4, wherein the bill is judged as legitimate when the actual measurement data of the length with respect to the printed area acquired from the first surface of the bill is equal to or less than the allowable range for the first surface and the corrected actual measurement data of the second surface obtained in the correction processing step is within the allowable range for the second surface.

6. The authenticity judgment method according to claim 4, wherein the bill is judged as counterfeit when the actual measurement data of the length with respect to the printed area acquired from the first surface of the bill is within the allowable range for the first surface and the actual measurement data of the printed area acquired on the second surface of the bill is out of the allowable range for the second surface.

7. The authenticity judgment method according to claim 4, wherein the reference value as the standard of the length of the printed area specified for each of the first and second surfaces of the bill is determined by extracting lengths of printed areas of first and second surfaces of a plurality of legitimate bills, and averaging the lengths of the printed areas of the first and second surfaces of the plurality of legitimate bills.

8. A method of conducting an authenticity judgment of a bill which has a first and a second objects on respective first and second surfaces serving as a standard length being optically measurable, comprising:

a first actual measurement step of measuring a length of the first object;

a second actual measurement step of measuring a length of the second object;

a first judging step of judging whether the actual measurement length measured in the first actual measurement step is within an allowable range by comparing with a predetermined reference value;

a second judging step of judging whether the actual measurement length measured in the second actual measurement step is within an predetermined allowable range when the actual measurement length measured in the first actual measurement step is out of the allowable range in the first judging step;

a second judging step of judging whether or not, when the actual measurement length measured in the first actual measurement step is out of the allowable range in the first judging step, after the actual measured length in the second actual measurement step is corrected by a predetermined relationship in a correction step, the corrected actual measured length is within the predetermined allowable range by comparing the corrected actual measured length with a predetermined reference value; and a step of judging the bill as legitimate when the actual measurement length measured in the second actual measurement step is within the predetermined allowable range by comparing the predetermined reference value in the second judging step.

9. The method according to claim 8, wherein the first and second actual measurement steps can be conducted simultaneously as the bill is conveyed.

10. The method according to claim 8, wherein at least one of the first and second objects is depicted in a longitudinal direction of the bill.

11. The bill processing apparatus according to claim 2, wherein:

lengths of printed areas on each of the first and second surfaces are extracted from a plurality of legitimate bills, and the reference value is an average value of the lengths of the printed areas of each of the first and second surfaces of the plurality of legitimate bills.

12. The authenticity judgment method according to claim 5, wherein the reference value as the standard of the length of the printed area specified for each of the first and second surfaces of the bill is determined by extracting lengths of printed areas of each of the first and second surfaces of a plurality of legitimate bills, and averaging the lengths of each of the first and second surfaces of the plurality of legitimate bills.

13. The authenticity judgment method according to claim 6, wherein the reference value as the standard of the length of the printed area specified for each of the first and second surfaces of the bill is determined by extracting lengths of printed areas of each of the first and second surfaces of a plurality of legitimate bills, and averaging the lengths of each of the first and second surfaces of the plurality of legitimate bills.

14. The method according to claim 9, wherein at least one of the first and second objects is depicted in a longitudinal direction of the bill.

* * * * *